(12) United States Patent
Haruta et al.

(10) Patent No.: US 10,815,355 B2
(45) Date of Patent: Oct. 27, 2020

(54) SILICONE POROUS BODY AND METHOD OF PRODUCING THE SAME

(71) Applicant: NITTO DENKO CORPORATION, Ibaraki-shi, Osaka (JP)

(72) Inventors: Hiromoto Haruta, Ibaraki (JP); Kozo Nakamura, Ibaraki (JP); Kazuki Uwada, Ibaraki (JP); Hiroyuki Takemoto, Ibaraki (JP); Nao Murakami, Ibaraki (JP); Daisuke Hattori, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 16/503,009

(22) Filed: Jul. 3, 2019

(65) Prior Publication Data
US 2019/0330438 A1  Oct. 31, 2019

Related U.S. Application Data

(62) Division of application No. 15/539,926, filed as application No. PCT/JP2015/086362 on Dec. 25, 2015, now Pat. No. 10,472,483.

(30) Foreign Application Priority Data

Dec. 26, 2014 (JP) ................................ 2014-266782
Jul. 31, 2015 (JP) ................................ 2015-152967
Sep. 7, 2015 (JP) ................................ 2015-176204

(51) Int. Cl.
C08J 9/24 (2006.01)
C08J 9/28 (2006.01)
(Continued)

(52) U.S. Cl.
CPC . C08J 9/24 (2013.01); C08J 9/28 (2013.01); C09D 183/04 (2013.01); C08G 77/04 (2013.01);
(Continued)

(58) Field of Classification Search
CPC . C08J 9/24; C08J 9/28; C08J 2201/026; C08J 2201/0504; C08J 2205/02;
(Continued)

(56) References Cited

U.S. PATENT DOCUMENTS 2,870,109 A * 1/1959 Nickerson ................ C08K 9/08
524/266
4,408,009 A    10/1983 Mallon
(Continued)

FOREIGN PATENT DOCUMENTS

CN    1221629 A    7/1999
CN    1256381 A    6/2000
(Continued)

OTHER PUBLICATIONS

Office Action dated Aug. 21, 2019, issued in TW application No. 104143837 (counterpart to U.S. Appl. No. 15/539,927), with partial English translation. (10 pages).
(Continued)

*Primary Examiner* — Kara B Boyle
(74) *Attorney, Agent, or Firm* — Westerman, Hattori, Daniels & Adrian, LLP

(57) ABSTRACT

The present invention provides, for example, a silicone porous body having a porous structure with less cracks and a high proportion of void space as well as having a strength. The silicone porous body of the present invention includes silicon compound microporous particles, wherein the silicon compound microporous particles are chemically bonded by catalysis. For example, the abrasion resistance measured
(Continued)

with BEMCOT® is in the range from 60% to 100%, and the folding endurance measured by the MIT test is 100 times or more. The silicone porous body can be produced, for example, by forming the precursor of the silicone porous body using sol containing pulverized products of a gelled silicon compound and then chemically bonding the pulverized products contained in the precursor of the silicone porous body. The chemical bond among the pulverized products is preferably a chemical crosslinking bond among the pulverized products, for example.

9 Claims, 8 Drawing Sheets

(51) Int. Cl.
  *C09D 183/04* (2006.01)
  *C08G 77/04* (2006.01)
(52) U.S. Cl.
  CPC .. *C08J 2201/026* (2013.01); *C08J 2201/0504* (2013.01); *C08J 2205/02* (2013.01); *C08J 2205/05* (2013.01); *C08J 2383/04* (2013.01)
(58) Field of Classification Search
  CPC . C08J 2205/05; C08J 2383/04; C09D 183/04; C08G 77/04
  See application file for complete search history.

(56) References Cited

U.S. PATENT DOCUMENTS

| | | | |
|---|---|---|---|
| 5,124,188 | A | 6/1992 | Roe et al. |
| 5,676,938 | A | 10/1997 | Kimura et al. |
| 5,844,060 | A | 12/1998 | Furuya et al. |
| 5,948,314 | A | 9/1999 | Geiss et al. |
| 5,948,482 | A | 9/1999 | Brinker et al. |
| 6,251,523 | B1 | 6/2001 | Takahashi et al. |
| 6,265,516 | B1 | 7/2001 | Okawa et al. |
| 6,300,385 | B1 | 10/2001 | Hashida et al. |
| 7,960,029 | B2 | 6/2011 | Kai et al. |
| 8,124,224 | B2 | 2/2012 | Kato et al. |
| 8,488,082 | B2 | 7/2013 | Nishiguchi et al. |
| 10,472,483 | B2 | 11/2019 | Haruta et al. |
| 2001/0003358 | A1 | 6/2001 | Terase et al. |
| 2003/0023021 | A1 | 1/2003 | Sakuma |
| 2003/0134124 | A1 | 7/2003 | Ochiai |
| 2004/0114248 | A1 | 6/2004 | Hokazono et al. |
| 2004/0132846 | A1 | 7/2004 | Leventis et al. |
| 2004/0216641 | A1 | 11/2004 | Hamada et al. |
| 2005/0038137 | A1 | 2/2005 | Yoshihara et al. |
| 2005/0162743 | A1 | 7/2005 | Yano et al. |
| 2005/0165197 | A1 | 7/2005 | Ogihara et al. |
| 2006/0239886 | A1 | 10/2006 | Nakayama et al. |
| 2006/0269724 | A1 | 11/2006 | Ohashi et al. |
| 2006/0269733 | A1 | 11/2006 | Mizuno et al. |
| 2006/0281828 | A1 | 12/2006 | Nakayama et al. |
| 2007/0206283 | A1 | 9/2007 | Ohtani et al. |
| 2008/0171188 | A1 | 7/2008 | Van Baak et al. |
| 2008/0290472 | A1 | 11/2008 | Yagihashi et al. |
| 2009/0244709 | A1 | 10/2009 | Suzuki et al. |
| 2010/0102251 | A1 | 4/2010 | Ferrini et al. |
| 2010/0256321 | A1 | 10/2010 | Kim et al. |
| 2011/0033398 | A1 | 2/2011 | Cauvin et al. |
| 2011/0224308 | A1 | 9/2011 | Saito et al. |
| 2013/0337161 | A1 | 12/2013 | Akimoto et al. |
| 2014/0371317 | A1 | 12/2014 | Aliyar et al. |
| 2015/0037535 | A1 | 2/2015 | Akimoto et al. |
| 2015/0166353 | A1 | 6/2015 | Kobayashi et al. |
| 2016/0194451 | A1 | 7/2016 | Yoshida et al. |

FOREIGN PATENT DOCUMENTS

| | | | |
|---|---|---|---|
| CN | 1275589 | A | 12/2000 |
| CN | 1544324 | A | 11/2004 |
| CN | 1646947 | A | 7/2005 |
| CN | 1809764 | A | 7/2006 |
| CN | 102460244 | A | 5/2012 |
| CN | 102736135 | A | 10/2012 |
| CN | 103213996 | A | 7/2013 |
| CN | 103660513 | A | 3/2014 |
| EP | 1031612 | A2 | 2/1999 |
| EP | 3 235 638 | A1 | 10/2017 |
| EP | 3239221 | A1 | 11/2017 |
| EP | 3239257 | A1 | 11/2017 |
| EP | 3246355 | A1 | 11/2017 |
| JP | 61-250032 | A | 11/1986 |
| JP | 5-506681 | A | 9/1993 |
| JP | H07-48527 | A | 2/1995 |
| JP | H07-133105 | A | 5/1995 |
| JP | 9-24575 | A | 1/1997 |
| JP | H10-508049 | A | 8/1998 |
| JP | H11-292568 | A | 10/1999 |
| JP | 2000-119433 | A | 4/2000 |
| JP | 2000-256040 | A | 9/2000 |
| JP | 2000-264620 | A | 9/2000 |
| JP | 2000-284102 | A | 10/2000 |
| JP | 2001-163613 | A | 6/2001 |
| JP | 2002-311204 | A | 10/2002 |
| JP | 2004-10424 | A | 1/2004 |
| JP | 2004-323752 | A | 11/2004 |
| JP | 2004323752 | A * | 11/2004 |
| JP | 2004-354699 | A | 12/2004 |
| JP | 2005-154195 | A | 6/2005 |
| JP | 2005-350519 | A | 12/2005 |
| JP | 2006-11175 | A | 1/2006 |
| JP | 2006-96019 | A | 4/2006 |
| JP | 2006-96967 | A | 4/2006 |
| JP | 2006-221144 | A | 8/2006 |
| JP | 2006-255496 | A | 9/2006 |
| JP | 2006-297329 | A | 11/2006 |
| JP | 2007-014946 | A | 1/2007 |
| JP | 2008-40171 | A | 2/2008 |
| JP | 2008-205008 | A | 9/2008 |
| JP | 2009-503226 | A | 1/2009 |
| JP | 2009-258711 | A | 11/2009 |
| JP | 2012-91943 | A | 5/2012 |
| JP | 2012-189802 | A | 10/2012 |
| JP | 2012-228878 | A | 11/2012 |
| JP | 2013-60309 | A | 4/2013 |
| JP | 2014-46518 | A | 3/2014 |
| JP | 2014-122309 | A | 7/2014 |
| JP | 2015-028540 | A | 2/2015 |
| JP | 2016-104551 | A | 6/2016 |
| TW | 213860 | B | 10/1993 |
| TW | 200300157 | A | 5/2003 |
| TW | 200844194 | A | 11/2008 |
| TW | 201447389 | A | 12/2014 |
| TW | 201447402 | A | 12/2014 |
| WO | 2010/120845 | A2 | 10/2010 |
| WO | 2010/120971 | A1 | 10/2010 |
| WO | 2012/115057 | A1 | 8/2012 |
| WO | 2012/124693 | A1 | 9/2012 |
| WO | 2014/034588 | A1 | 3/2014 |

OTHER PUBLICATIONS

Office Action dated Nov. 6, 2019, issued in CN application No. 201580071018.3 (counterpart to U.S. Appl. No. 15/539,946), with English translation. (13 pages).

Office Action dated Nov. 6, 2019, issued in CN application No. 201580071036.1 (counterpart to U.S. Appl. No. 15/539,926), with English translation. (13 pages).

Office Action dated Feb. 4, 2020, issued in TW application No. 105124140 (counterpart to U.S. Appl. No. 15/749,250), with partial English translation. (21 pages).

Office Action dated Feb. 4, 2020, issued in TW application No. 105125188 (counterpart to U.S. Appl. No. 15/754,406), with partial English translation. (12 pages).

Office Action dated Feb. 5, 2020, issued in TW application No. 105124139 (counterpart to U.S. Appl. No. 15/749,148), with partial English translation. (15 pages).

(56) References Cited

OTHER PUBLICATIONS

Non-Final Office Action dated Mar. 18, 2020, issued in U.S. Appl. No. 15/754,406. (9 pages).
Office Action dated Mar. 16, 2020, issued in CN application No. 201680037679.9 (counterpart to U.S. Appl. No. 15/749,148), with English translation. (13 pages).
Non-Final Office Action dated Jan. 24, 2020, issued in U.S. Appl. No. 15/539,946. (63 pages).
Office Action dated Dec. 24, 2019, issued in JP application No. 2016-149062 (counterpart to U.S. Appl. No. 15/754,406), with English translation. (6 pages).
Office Action dated Jan. 7, 2020, issued in JP application No. 2016-149060 (counterpart to U.S. Appl. No. 15/749,250), with English translation. (12 pages).
Office Action dated Jan. 7, 2020, issued in JP application No. 2016-149061 (counterpart to U.S. Appl. No. 15/749,148), with English translation. (12 pages).
Final Office Action dated Jan. 24, 2020, issued in U.S. Appl. No. 15/539,928. (8 pages).
Office Action dated Mar. 2, 2020, issued in EP application No. 15873333.7 (counterpart to U.S. Appl. No. 15/539,927). (4 pages).
Non-Final Office Action dated Jul. 10, 2019, issued in U.S. Appl. No. 15/539,928 (36 pages).
Office Action dated Jun. 28, 2019, issued in CN application No. 201580071024.9 (counterpart to U.S. Appl. No. 15/539,928), with partial machine translation. (12 pages).
Office Action dated Jul. 1, 2019, issued in CN application No. 201680043414.X (counterpart to U.S. Appl. No. 15/754,406), with partial machine translation. (15 pages).
Office Action dated Jun. 26, 2019, issued in TW application No. 104143838 (counterpart to U.S. Appl. No. 15/539/946), with partial translation. (15 pages).
Office Action dated Aug. 6, 2019, issued in JP application No. 2019-133188 (counterpart to U.S. Appl. No. 15/539,946), with partial English translation. (7 pages).
Office Action dated Jul. 2, 2019, issued in counterpart TW application No. 104143841, with partial English translation. (11 pages).
Search Report dated May 31, 2019, issued in CN application No. 2016800376799 (counterpart to U.S. Appl. No. 15/749,148). (1 pages).
Yildirim et al., "Template free preparation of nanoporous organically modified silica thin films on flexible substrates", Journal of Materials Chemistry, 2011, 21, pp. 14830-14837, cited in Specification of PCT/JP2015/086364, PCT/JP2015/086365 and PCT/JP2016/072452.
Adachi et al., "Preparation of the Silica Gel Monolith by the Sol-Gel Method Using N, N-Dimethylformamide and the Vitrification of the Gel", Yogyo-Kyokai-Shi, 1987, 95, pp. 970-975.
International Search Report dated Mar. 8, 2016, issued in International Application No. PCT/JP2015/086362 (counterpart of U.S. Appl. No. 15/539,926).
International Search Report dated Mar. 8, 2016, issued in International Application No. PCT/JP2015/086363 (counterpart of U.S. Appl. No. 15/539,946).
International Search Report dated Apr. 12, 2016, issued in International Application No. PCT/JP2015/086364 (counterpart of U.S. Appl. No. 15/539,928).
International Search Report dated Mar. 29, 2016, issued in International Application No. PCT/JP2015/086365 (counterpart of U.S. Appl. No. 15/539,927).
International Search Report dated Nov. 8, 2016, issued in International Application No. PCT/JP2016/072417 (counterpart of U.S. Appl. No. 15/749,250).
International Search Report dated Nov. 8, 2016, issued in International Application No. PCT/JP2016/072418 (counterpart of U.S. Appl. No. 15/749,148).
International Search Report dated Nov. 8, 2016, issued in International Application No. PCT/JP2016/072452 (counterpart of U.S. Appl. No. 15/754,406).
International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237.
International Preliminary Report on Patentability (Form PCT/IB/373) dated Jun. 27, 2017 of International Application No. PCT/JP2015/086364(counterpart of U.S. Appl. No. 15/539,928), with Form PCT/ISA/237.
International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237.
International Preliminary Report on Patentability (Form PCT/IB/373) dated Jun. 27, 2017 of International Application No. PCT/JP2015/086362(counterpart of U.S. Appl. No. 15/539,926), with Form PCT/ISA/237.
International Preliminary Report on Patentability (Form PCT/IB/373) dated Feb. 6, 2018 of International Application No. PCT/JP2016/072418(counterpart of U.S. Appl. No. 15/749,148), with Form PCT/ISA/237.
International Preliminary Report on Patentability (Form PCT/IB/373) dated Feb. 6, 2018 of International Application No. PCT/JP2016/072417(counterpart of U.S. Appl. No. 15/749,250), with Form PCT/ISA/237.
International Preliminary Report on Patentability (Form PCT/IB/373) dated Feb. 27, 2018 of International Application No. PCT/JP2016/072452(counterpart of U.S. Appl. No. 15/754,406), with Form PCT/ISA/237.
Requirement for Restriction Election dated Feb. 27, 2019, issued in U.S. Appl. No. 15/539,928.
Requirement for Restriction Election dated Feb. 8, 2019, issued in U.S. Appl. No. 15/539,946.
Non-Final Office Action dated Jul. 27, 2018, issued in U.S. Appl. No. 15/539,927.
Extended European Search Report in European Patent Application No. 15873332.9 dated Aug. 13, 2018, corresponds to U.S. Appl. No. 15/539,928.
Office Action dated Feb. 27, 2019, issued in CN application No. 201580071004.1 (counterpart to U.S. Appl. No. 15/539,927), with partial English translation.
Horiba Scientific, "Particle Size Result Interpretation: Number vs. Volume Distributions", website entry: url http://www.horiba.com/scientific/products/particle-characterization/education/general-information/data-interpretation/number-vs-volume-distributions/, cited in Notice of Allowance dated Mar. 28, 2019.
Notice of Allowance dated Mar. 28, 2019, issued in U.S. Appl. No. 15/539,927.
Extended (Supplementary) European Search Report dated Mar. 7, 2019, issued in EP application No. 16839019.3 (counterpart to U.S. Appl. No. 15/754,406).
"What is Aerogel?" (Year:2008), cited in Non-Final Office Action dated Jun. 18, 2018, https;//web.archive.org/web/20080621095754/http://www.aerogel.org/?p=3.
Extended European Search Report dated Jun. 27, 2018, issued in Application No. 15873330.3 (PCT/JP2015086362).
Extended (Supplementary) European Search Report dated Mar. 6, 2019, issued in EP application No. 16832970.4 (counterpart to U.S. Appl. No. 15/749,148).
Office Action dated Feb. 7, 2019, issued in EP application No. 15873333.7(counterpart to U.S. Appl. No. 15/539,927).
Extended (Supplementary) European Search Report dated Feb. 14, 2019, issued in EP application No. 16832969.6 (counterpart to U.S. Appl. No. 15/749,250).
Office Action dated Oct. 31, 2018, issued in counterpart Chinese application No. 201580071024.9, corresponds to U.S. Appl. No. 15/539,928.
Extended (Supplementary) European Search Report dated Sep. 24, 2018, issued in counterpart application No. 15873331.1.
Extended European Search Report dated Jun. 14, 2018, issued in Application No. 15873333.3 (PCTT/JP2015086365).
Baris R. Mutiu et al., "Silicon alkoxide cross-linked silica nanoparticles gels for encapsulation of bacterial biocatalysts", Journal of Materials Chemistry A., 2013.

(56) References Cited

OTHER PUBLICATIONS

Markus Börner et al., "Cross-Linked Monolithic Xerogels Based on Silica Nanoparticles", Chemistry of Materials, 2013, pp. 3648-3653.
Office Action dated Jun. 11, 2019, issued in JP application No. 2015-176205 (counterpart to U.S. Appl. No. 15/539,946).
Office Action dated Jun. 13, 2019, issued in JP application No. 2015-176204 (counterpart to U.S. Appl. No. 15/539,926).
Office Action dated May 31, 2019, issued in CN application No. 201680037679.9 (counterpart to U.S. Appl. No. 15/749,148), with English translation. (10 pages).
Office Action dated Aug. 26, 2019, issued in EP application No. 15873333.7 (counterpart to U.S. Appl. No. 15/539,927). (3 pages).
Office Action dated Jul. 22, 2019, issued in TW application No. 104143840 (counterpart to U.S. Appl. No. 15/539,928), with English translation. (13 pages).
Office Action dated May 18, 2020, issued in counterpart CN application No. 201580071024.9, with English translation. (27 pages).
Office Action dated June 11, 2020, issued in CN application No. 201680043414.X, (counterpart to U.S. Appl. No. 15/754,406), with English translation. (13 pages).
Non-Final Office Action dated Aug. 5, 2020, issued in U.S. Appl. No. 15/749,250 (68 pages).
Office Action dated Jul. 31, 2020, issued in counterpart CN application No. 201580071036.1, with English translation. (17 pages).
Office Action dated Aug. 5, 2020, issued in CN application No. 201580071018.3, with English translation, counter part U.S. Appl. No. 15/539,946. (18 pages).

* cited by examiner

SILICONE POROUS BODY AND METHOD OF PRODUCING THE SAME

CROSS-REFERENCE TO RELATED APPLICATIONS

This application is a divisional of U.S. application Ser. No. 15/539,926, filed on Jun. 26, 2017, which is a 371 of International Application No. PCT/JP2015/086362, filed on Dec. 25, 2015, which is based upon and claims the benefit of priority from the prior Japanese Patent Application No. 2014-266782, filed on Dec. 26, 2014, Japanese Patent Application No. 2015-152967 filed on Jul. 31, 2015, Japanese Patent Application No. 2015-176204 filed on Sep. 7, 2015, the entire contents of which are incorporated herein by reference.

TECHNICAL FIELD

The present invention relates to a silicone porous body and a method of producing the same.

BACKGROUND ART

There are lots of examples of a porous structure made by using various materials and production methods. The porous structure is used for products in a wide range of fields including optical elements such as low refractive index layers, heat insulating materials, sound absorbing materials, and regenerative medical bases. The porous structure includes a closed-cell structure in which independent void spaces (pores) are dispersed, an open-cell structure in which the closed-cell structures are interconnected, and the like, which are defined according to the dispersion state of pores. The porous structure can be defined also according to a size of the void space and various other matters.

As a method of producing such a porous structure, for example, there is a method of substituting a solvent contained in a wet gel with gas under its supercritical condition to obtain a dry gel with no shrinkage in which the skeletal structure of the wet gel is frozen as it is (see, for example, Patent Document 1). This dry gel can be divided into: a xerogel obtained by gradually removing a gel solvent by evaporation under a normal pressure; and an aerogel, which is "a gel like air", having a low bulk density and a high porosity.

A common problem in producing an aerogel bulk body is to prevent a gel body from cracking in drying of the gel. The crack is made when the tensile stress by the capillary force based on the surface tension of a solution remaining in a pore of the gel body in drying is greater than the strength of the gel. Under a supercritical condition, a bulk body with no crack can be obtained because of no surface tension, however, there is a case that a crack is made during high temperature sintering treatment as a process of removing big pores afterwards. For the purpose of reducing cracks to be caused during such high temperature treatment, there are examples of using a solvent having a higher boiling point than water and having a small surface tension, mixing silica fine particles into a solvent, and the like (Non-Patent Document 1).

On the other hand, forming a silicone porous body having a high proportion of void space (porosity) has a problem that its strength significantly decreases because of decrease in the bulk density of a silica gel material. The decrease in the strength causes a problem in use, such as decrease in an abrasion resistance. Regarding this matter, there have been disclosed the methods of baking a silicone porous body to increase the strength (see, for example, Patent Documents 2 to 5). These methods, however, are premised on a batch process since high temperature treatment at 200° C. or more is performed for a long period of time in baking treatment. Thus, a continuous production cannot be performed industrially. Moreover, the baking treatment has a problem of causing cracks because of the great change in volume in cooling upon completion of the sintering after the crystal stable phase of a silica gel has been transited from a low-temperature phase to a high-temperature phase.

On the other hand, there has also been disclosed a method of applying alkali treatment to a silica aerogel film to cause a condensation reaction of an unreacted silanol group, thereby increasing the strength of the silica aerogel film (see, for example, Patent Document 6). In this case, however, since a formed silica aerogel film is immersed in an alkali treatment solution, a dehydration condensation reaction of the unreacted silanol group due to penetration of the alkaline solution into voids is assumed to be caused. This causes a silica aerogel film to be swollen and dried, and this decreases the proportion of void space of the silica aerogel film after the alkali treatment. The strength and the proportion of void space have a trade-off relationship and it is difficult to achieve both properties.

CITATION LIST

Patent Document (s)

Patent Document 1: JP 2005-154195 A
Patent Document 2: JP 2006-297329 A
Patent Document 3: JP 2006-221144 A
Patent Document 4: JP 2006-011175 A
Patent Document 5: JP 2008-040171 A
Patent Document 6: JP 2009-258711 A

Non-Patent Document(s)

Non-Patent Document 1: T. Adachi, J. Mater. Sci., 22. 4407-4410 (1987)

BRIEF SUMMARY OF THE INVENTION

Problem to be Solved by the Invention

Hence, the present invention is intended to provide, for example, a silicone porous body having a porous structure with less cracks and a high proportion of void space having a strength, and a method of producing the same.

Means for Solving Problem

In order to achieve the above object, the present invention provides a silicone porous body including: silicon compound microporous particles, wherein the silicon compound microporous particles are chemically bonded by catalysis.

The present invention also provides a method of producing a silicone porous body, including steps of: preparing a liquid containing silicon compound microporous particles; adding a catalyst for chemically bonding the silicon compound microporous particles to the liquid; and chemically bonding the microporous particles by catalysis.

Effects of the Invention

The silicone porous body of the present invention uses the silicon compound microporous particles and the porous structure is immobilized by the chemical bond among the silicon compound microporous particles by catalysis. This allows the present invention to provide a silicone porous body having a porous structure with less cracks and a high proportion of void space as well as having a strength.

DETAILED DESCRIPTION OF THE INVENTION

Figure 1:
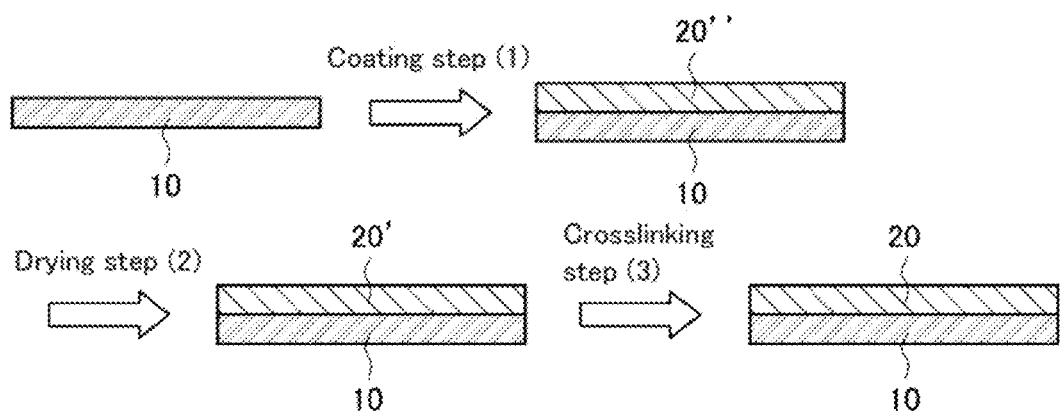
FIG. 1 is a process cross sectional view schematically showing an example of the method of forming a silicone porous body 20 on a base 10 in the present invention.

The porous structure of the silicone porous body of the present invention is an open-cell structure in which pore structures are interconnected, for example.

In the production method of the present invention, for example, the catalyst promotes the crosslinking bond among silicon compound sols.

The present invention is described below in more detail with reference to illustrative examples. The present invention, however, is not limited or restricted by the following description.

[1. Silicone Porous Body]

As described above, the silicone porous body of the present invention is characterized in that it includes silicon compound microporous particles, wherein the silicon compound microporous particles are chemically bonded by catalysis. In the present invention, the shape of the "particle" (for example, the silicon compound microporous particle) is not limited to particular shapes, and can be, for example, a spherical shape, a non-spherical shape, and the like.

The silicone porous body of the present invention has a three-dimensional structure by chemical bond (for example, crosslinking) among the silicon compound microporous particles by catalysis. The silicone porous body of the present invention having such a configuration, despite its structure with void spaces, can maintain a sufficient strength and sufficient flexibility for reducing cracks. Thus, the silicone porous body of the present invention can be used for various members as a bulk body or a film having a porous structure, for example. Specifically, the silicone porous body of the present invention can be used, for example, as optical elements such as low refractive index layers, heat insulating materials, sound absorbing materials, regenerative medical bases, dew condensation preventing materials, and ink image receiving members. The silicone porous body of the present invention is particularly preferably a xerogel, for example, although it differs depending on applications and purposes. Heretofore, the xerogel has been superior in strength but inferior in proportion of void space, whereas the aerogel has been high in proportion of void space but low in strength. In this regard, the silicone porous body of the present invention achieves both a high proportion of void space and a high strength. In other words, the silicone porous body of the present invention achieves a high proportion of void space as in the case of an aerogel even with a xerogel, for example. Furthermore, in the silicone porous body of the present invention, the silicon compound microporous particle is preferably a pulverized product of a gelled silicon compound. The pulverized products of a gelled silicon compound form a new three-dimensional structure which is different from the structure formed of unpulverized gelled silicon compounds, and a chemical bond (for example, crosslinking) is formed among the pulverized products. This allows the silicone porous body of the present invention to achieve properties (for example, sufficient strength, sufficient flexibility, and the like), which are different from those of a porous body formed of unpulverized gelled silicon compounds. In the present invention, the silicon compound microporous particle may be, for example, a sol-gel beaded particle, a nanoparticle (hollow nanosilica/nanoballoon particle), nanofiber, and the like.

As described above, the silicone porous body of the present invention includes the silicon compound microporous particles (preferably, pulverized products of a gelled silicon compound), wherein the silicon compound microporous particles are chemically bonded by catalysis. In the silicone porous body of the present invention, the pattern of the chemical bond among the silicon compound microporous particles is not limited to particular patterns. Specifically, the chemical bond can be, for example, a crosslinking bond. The method of chemically bonding the silicon compound microporous particles is described in detail in the description as to the production method of the present invention.

The crosslinking bond is, for example, a siloxane bond. The chemical bond of the present invention, however, is not limited to a siloxane structure. Examples of the siloxane bond include T2 bond, T3 bond, and T4 bond shown below. In the case where the silicone porous body of the present invention has the siloxane bond, the porous body of the present invention may have one of, two of, or all of the above-mentioned three bond patterns, for example. The silicone porous body having higher proportions of T2 and T3 is superior in flexibility and can be expected to have an original property of a gel but is inferior in strength. On the other hand, the silicone porous body having a higher proportion of T4 is superior in strength but has small sized voids and is inferior in flexibility. Thus, it is preferable to change the proportions of T2, T3, and T4 depending on applications, for example.

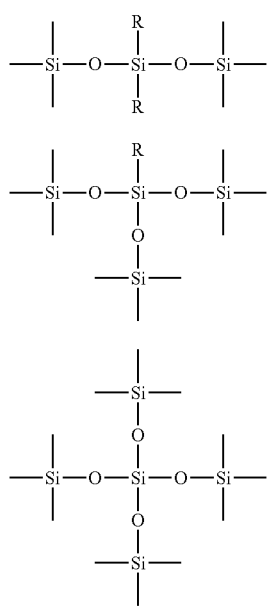

In the case where the silicone porous body of the present invention has the siloxane bond, the relative ratio among T2, T3, and T4 with T2 being considered as "1" is, for example, as follows:
T2:T3:T4=1: [1 to 100]:[0 to 50], 1:[1 to 80]:[0 to 40], or 1:[5 to 60]:[0 to 30].

The silicon atoms contained in the silicone porous body of the present invention are preferably bonded by a siloxane bond, for example. As a specific example, the proportion of the unbonded silicon atoms (i.e., residual silanol) among all the silicon atoms contained in the silicone porous body is, for example, less than 50%, 30% or less, or 15% or less.

The silicon compound microporous particle is not limited to particular particles, and is preferably a pulverized product of a gelled silicon compound as described above. The gel form of the gelled silicon compound is not limited to particular forms. The "gel" commonly denotes a solidified state of solutes aggregated as they lost independent motility due to interaction. Commonly, a wet gel is a gel containing a dispersion medium in which solutes build a uniform structure, and a xerogel is a gel from which a solvent is removed and in which solutes form a network structure with void spaces. In the present invention, the gelled silicon compound is preferably a wet gel, for example.

Figure 4:
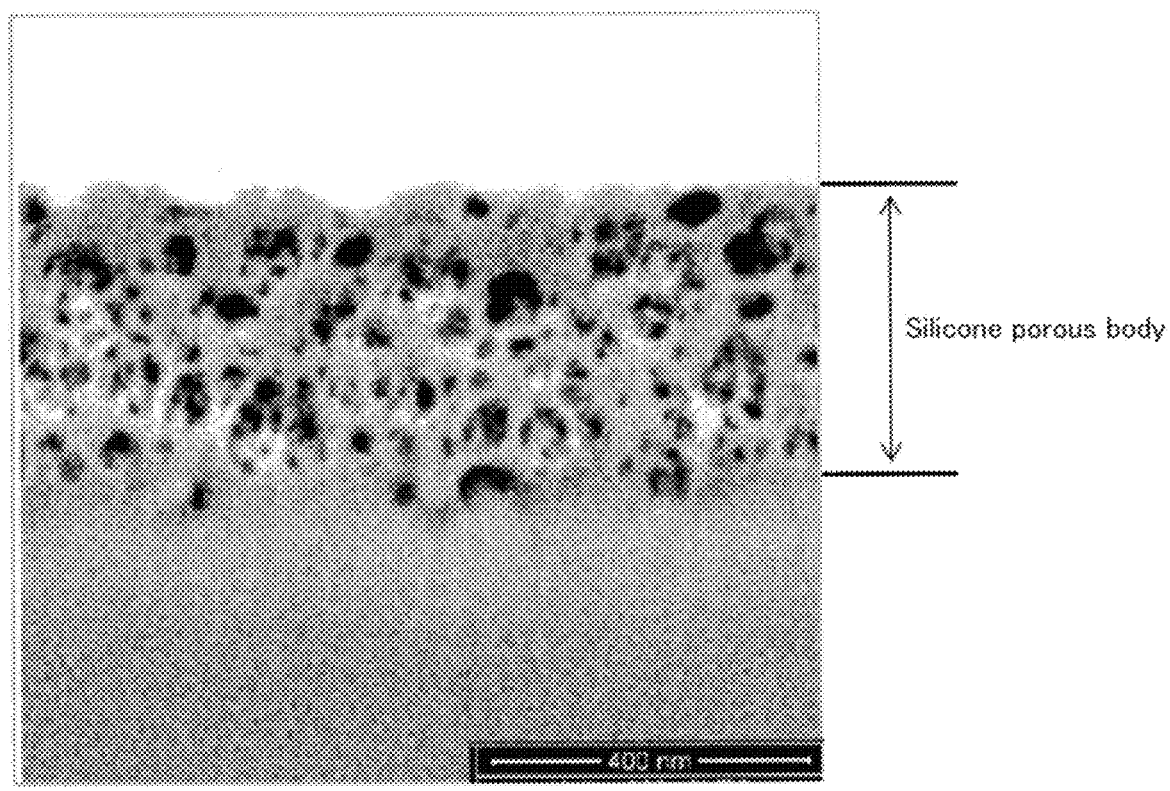
FIG. 4 is a cross sectional SEM image of a silicone porous body of the Example.

The silicone porous body of the present invention has a pore structure, for example. The size of a void space (pore) in the present invention indicates not the diameter of the short axis but the diameter of the long axis of the void space. The size of a void space (pore) is preferably in the range from 5 nm to 10 cm, for example. The lower limit of the size of a void space is, for example, 5 nm or more, 10 nm or more, or 20 nm or more, the upper limit of the size of a void space is, for example, 10 cm or less, 1 mm or less, or 1 µm or less, and the size of a void space is, for example, in the range from 5 nm to 10 cm, 10 nm to 1 mm, or 20 nm to 1 µm. A preferable size of a void space changes depending on applications of the void-provided structure. Thus, the size of a void space should be adjusted to a desired size according to purposes, for example. A preferable example of the pore structure in the silicone porous body of the present invention is, for example, as shown in FIG. 4 (cross sectional SEM image) in the Examples below. FIG. 4 however is an example and does not limit the present invention by any means. The size of a void space can be evaluated, for example, by the method described below.

(Observation of Cross Section of Silicone Porous Body Using SEM)

In the present invention, the form of a silicone porous body can be observed and analyzed using a scanning electron microscope (SEM). Specifically, for example, a silanol porous body sample formed on a resin film is subjected to a FIB processing (acceleration voltage: 30 kV) under a cooling condition, the thus obtained cross sectional sample is observed using FIB-SEM (product of FEI, product name: Helios NanoLab 600, acceleration voltage: 1 kV), and a cross sectional electron image can be obtained with an observation magnification×100,000.

(Evaluation of Size of Void Space)

In the present invention, the size of a void space can be quantified according to the BET test. Specifically, 0.1 g of a sample (the silicone porous body of the present invention) is set in the capillary of a surface area measurement apparatus (product of Micrometrics, product name: ASAP 2020), and dried under a reduced pressure at room temperature for 24 hours to remove gas in the void-provided structure. Then, an adsorption isotherm is created by adsorbing a nitrogen gas to the sample, thereby obtaining a pore distribution. The size of a void space can thereby be evaluated.

The abrasion resistance of the silicone porous body of the present invention measured with BEMCOT® is, for example, in the range from 60% to 100%. The abrasion resistance means, for example, a strength such as a film strength. The present invention having such a strength has a superior abrasion resistance in various processes, for example. The present invention has a scratch resistance during a production process including winding a formed silicone porous body and handling a product film, for example. The silicone porous body of the present invention can increase a film strength while adjusting a film density, for example. Specifically, by utilizing the catalysis in the heating step described below, the bonding force among the silicon compound microporous particles can be increased by subjecting silanol groups of the silicon compound microporous particles (preferably, silica sol fine particles; more preferably, silica sol fine particles obtained by pulverizing a gelled silica compound) to a crosslinking reaction. By adjusting the balance between the amount of the residual silanol group and the crosslinking reaction, a film strength can be imparted while controlling a porosity. Thus, the silicone porous body of the present invention can impart a certain level of strength to a void-provided structure which is intrinsically fragile, for example.

The lower limit of the abrasion resistance is, for example, 60% or more, 80% or more, or 90% or more, and the upper limit of the abrasion resistance is, for example, 100% or less, 99% or less, or 98% or less, and the abrasion resistance is, for example, in the range from 60% to 100%, 80% to 99%, or 90% to 98%.

The abrasion resistance can be measured, for example, by the method described below.

(Evaluation of Abrasion Resistance)

(1) A layer with void spaces (the silicone porous body of the present invention, herein after also referred to as a "void-provided layer") formed on an acrylic film by coating is cut into a circle having a diameter of about 15 mm as a sample.

(2) Next, as to the sample, the coating amount of Si ($Si_0$) is measured by identifying silicon by X-ray fluorescence (product of Shimadzu Corporation, product name: ZSX Primus II). Subsequently, the void-provided layer on the acrylic film in proximity to the site where the circular sample was obtained is cut so as to have a piece having a size of 50 mm×100 mm, the obtained piece is fixed to a glass plate (thickness: 3 mm), and a sliding test is performed using BEMCOT®. The sliding condition is as follows: weight: 100 g, reciprocation: 10 times.

(3) The sampling and X-ray fluorescence measurement of the void-provided layer after finishing sliding are performed in the same manner as the above described item (1) to measure the residual amount of Si ($Si_1$) after an abrasion test. The abrasion resistance is defined by the residual ratio of Si (%) before and after the sliding test using BEMCOT®, and is represented by the following formula.

abrasion resistance (%)=[residual amount of Si ($Si_1$)/ Si coating amount ($Si_0$)]×100(%)

The folding endurance of the silicone porous body of the present invention by the MIT test is, for example, 100 times or more. The folding endurance shows flexibility, for example. The flexibility means deformability of a substance, for example. Since the present invention has such flexibility, for example, cracks can be reduced and a superior winding ability in production and a superior handleability in use can be achieved, for example.

The lower limit of the folding endurance is, for example, 100 times or more, 500 times or more, or 1000 times or more, the upper limit of the folding endurance is not limited to particular values and is, for example, 10000 times or less, and the folding endurance is, for example, in the range from 100 to 10000 times, 500 to 10000 times, or 1000 to 10000 times.

The folding endurance by the MIT test can be measured, for example, by the method described below.

(Evaluation of Folding Endurance Test)

The void-provided layer (the silicone porous body of the present invention) is cut into a piece having a size of 20 mm×80 mm, then the obtained piece is attached to a MIT folding endurance tester (production of TESTER SANGYO CO., LTD., product name: BE-202), and 1.0 N load is applied thereto. A chuck of R 2.0 mm for holding the void-provided layer is used, application of load is at most 10000 times, and the number of times of application of load at the time of fracture of the void-provided layer is assumed as the folding endurance.

The film density of the silicone porous body of the present invention is not limited to particular values, and the lower limit thereof is, for example, 1 g/cm³ or more, 10 g/cm³ or more, or 15 g/cm³ or more, the upper limit thereof is, for example, 50 g/cm³ or less, 40 g/cm³ or less, 30 g/cm³ or less, or 2.1 g/cm³ or less, and the film density is, for example, in the range from 5 to 50 g/cm³, 10 to 40 g/cm³, 15 to 30 g/cm³, or 1 to 2.1 g/cm³. In the silicone porous body of the present invention, the porosity based on the film density is not limited to particular values, and the lower limit thereof is, for example, 40% or more, 50% or more, 70% or more, or 85% or more, the upper limit thereof is, for example, 98% or less, or 95% or less, and the porosity is, for example, in the range from 40% to 98%, 50% to 95%, 70% to 95%, or 85% to 95%.

The film density can be measured, for example, by the method described below, and the porosity can be calculated, for example, as follows based on the film density.

(Evaluation of Film Density and Porosity)

After forming a void-provided layer (the silicone porous body of the present invention) on a base (acrylic film), the X-ray reflectivity in a total reflection region of the void-provided layer of this laminate is measured using an X-ray diffractometer (product of RIGAKU, product name: RINT-2000). Then, after fitting with Intensity at 20, the film density (g/cm³) is calculated from the total reflection angle of the laminate (void-provided layer and base), and the porosity (P %) is calculated by the following formula.

porosity (P %)=45.48×film density (g/cm³)+100(%)

It is only required that the silicone porous body of the present invention has a pore structure (porous structure) as described above, and the silicone porous body may have an open-cell structure in which the pore structures are interconnected, for example. The open-cell structure means, for example, that the pore structures are three-dimensionally interconnected in the silicone porous body, i.e., void spaces in the pore structures are interconnected. When a porous body has an open-cell structure, the porosity of the silicone porous body can be increased. However, an open-cell structure cannot be formed with closed-cell particles such as hollow silica. In this regard, since the silicon compound microporous particles (preferably, silica sol fine particles; more preferably, silica sol fine particles which are pulverized products of a gelled silicon compound which forms sol) have a three-dimensional dendritic structure, the silicone porous body can form an open-cell structure easily, for example, by settlement and deposition of the dendritic particles in a coating film (sol coating film containing the silica sol fine particles) during a production process. The silicone porous body of the present invention preferably forms a monolith structure in which the open-cell structure has multiple pore distributions. The monolith structure denotes a hierarchical structure including a structure in which nano-sized void spaces are present and an open-cell structure in which the nano-sized spaces are aggregated, for example. The monolith structure can impart a strength with minute void spaces while imparting a high porosity with coarse open-cell structure, which achieve both a strength and a high porosity, for example. For forming such a monolith structure, for example, it is preferable to control the pore distribution of a void-provided structure to be created in a gel (gelled silicon compound) before pulverizing into the silica sol fine particles. For example, by controlling the particle size distribution of silica sol fine particles after pulverization to a desired size in pulverization of the gelled silicon compound, the monolith structure can be formed.

In the silicone porous body of the present invention, the haze showing transparency is not limited to particular values, and the lower limit thereof is, for example, 0.1% or more, 0.2% or more, or 0.3% or more, the upper limit thereof is, for example, 30% or less, 10% or less, or 3% or less, and the haze is, for example, in the range from 0.1% to 30%, 0.2% to 10%, or 0.3% to 3%.

The haze can be measured, for example, by the method described below.

(Evaluation of Haze)

A void-provided layer (the silicone porous body of the present invention) is cut into a piece having a size of 50 mm×50 mm, and the obtained piece is set to a hazemeter (product of Murakami Color Research Laboratory, product name: HM-150) to measure a haze. The haze value is calculated by the following formula.

haze (%)=[diffuse transmittance (%)/total light transmittance (%)]×100(%)

Commonly, a ratio between the transmission speed of the wavefront of light in vacuum and the phase velocity of light in a medium is called a refractive index of the medium. The refractive index of the silicone porous body of the present invention is not limited to particular values, and the upper limit thereof is, for example, 1.25 or less, 1.20 or less, or 1.15 or less, the lower limit thereof is, for example, 1.05 or more, 1.06 or more, or 1.07 or more, and the refractive index is, for example, in the range from 1.05 to 1.25, 1.06 to 1.20, or 1.07 to 1.15.

In the present invention, the refractive index is a refractive index measured at a wavelength of 550 nm unless otherwise stated. The method of measuring a refractive index is not limited to particular methods, and the refractive index can be measured, for example, by the method described below.

(Evaluation of Refractive Index)

After forming a void-provided layer (the silicone porous body of the present invention) on an acrylic film, the obtained laminate is cut into a piece having a size of 50 mm×50 mm, and the obtained piece is adhered to the front surface of a glass plate (thickness: 3 mm) through a pressure-sensitive adhesive layer. The center of the back surface of the glass plate (diameter: about 20 mm) is solidly painted with a black magic marker, thereby preparing a sample which allows no reflection at the back surface of the glass plate. The sample is set to an ellipsometer (product of J. A. Woollam Japan, product name: VASE), the refractive index is measured at a wavelength of 500 nm and at an incidence angle of 50° to 80°, and the average value is assumed as a refractive index.

The thickness of the silicone porous body of the present invention is not limited to particular values, and the lower limit thereof is, for example, 0.01 μm or more or 0.05 μm or more, the upper limit thereof is, for example, 1 m or less, 1 cm or less, or 100 μm or less, and the thickness is, for example, in the range from 0.05 to 100 μm. When the silicone porous body is used as a film, the thickness is adjusted according to applications and required characteristics. The thickness is preferably 0.01 μm or more and 10 μm or less, for example, in the case where priority is put on transmittance, and the thickness is preferably 100 μm or more and 1 m or less, for example, in the case where priority is put on adiabaticity.

The gelled silicon compound can be, for example, a gelled product obtained by gelating monomer silicon compounds. Specifically, the gelled silicon compound can be, for example, a gelled product in which the monomer silicon compounds are bonded. As a specific example, the gelled silicon compound can be a gelled product in which the monomer silicon compounds are bonded by a hydrogen bond or an intermolecular bond. The bond can be, for example, a bond by dehydration condensation. The method of gelation is described below in the description as to the production method of the present invention.

In the present invention, the monomer silicon compound is not limited to particular compounds. The monomer silicon compound can be, for example, a compound represented by the following chemical formula (1). When the gelled silicon compound is a gelled product in which monomer silicon compounds are bonded by a hydrogen bond or an intermolecular bond as described above, monomers in the chemical formula (1) can be bonded by a hydrogen bond through their hydroxyl groups, for example.

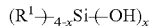  (1)

In the chemical formula (1), for example, X is 2, 3, or 4, and $R^1$ represents a linear or a branched alkyl group. The carbon number of $R^1$ is, for example, 1 to 6, 1 to 4, or 1 to 2. Examples of the linear alkyl group include a methyl group, an ethyl group, a propyl group, a butyl group, a pentyl group, and a hexyl group, and examples of the branched alkyl group include an isopropyl group and an isobutyl group. The X is, for example, 3 or 4.

A specific example of the silicon compound represented by the chemical formula (1) can be a compound represented by the chemical formula (1'), wherein X is 3. In the chemical formula (1'), $R^1$ is the same as that in the chemical formula (1), and is, for example, a methyl group. When $R^1$ represents a methyl group, the silicon compound is tris(hydroxy)methylsilane. When X is 3, the silicon compound is, for example, trifunctional silane having three functional groups.

  (1')

A specific example of the silicon compound represented by the chemical formula (1) can be a compound represented by the chemical formula (1') wherein X is 4. In this case, the silicon compound is, for example, tetrafunctional silane having four functional groups.

The monomer silicon compound may be, for example, a hydrolysate of a silicon compound precursor. The silicon compound precursor is not limited as long as it can generate the silicon compound by hydrolysis, for example. A specific example of the silicon compound precursor can be a compound represented by the following chemical formula (2).

  (2)

In the chemical formula (2), for example, X is 2, 3, or 4, $R^1$ and $R^2$ each represent a linear or branched alkyl group, $R^1$ and $R^2$ may be the same or different, $R^1$ may be the same or different in the case where X is 2, and $R^2$ may be the same or different.

X and $R^1$ are the same as those in the chemical formula (1), for example. Regarding $R^2$, for example, reference can be made to the examples of $R^1$ in the chemical formula (1).

A specific example of the silicon compound precursor represented by the chemical formula (2) can be a compound represented by the chemical formula (2') wherein X is 3. In the chemical formula (2'), $R^1$ and $R^2$ are the same as those in the chemical formula (2). When $R^1$ and $R^2$ both represent methyl groups, the silicon compound precursor is trimethoxy(methyl)silane (hereinafter, also referred to as "MTMS").

  (2')

The monomer silicon compound is not limited to particular compounds, and can be selected, for example, according to applications of the silicone porous body of the present invention. In the silicone porous body of the present invention, in the case where priority is put on the lowness of refractive index, the monomer silicon compound is preferably the trifunctional silane because it is superior in the lowness of refractive index, and in the case where priority is put on a strength (for example, abrasion resistance), the monomer silicon compound is preferably the tetrafunctional silane because it is superior in an abrasion resistance. On the other hand, in the case where priority is put on flexibility, the monomer silicon compound is preferably the difunctional silane because it is superior in flexibility. Regarding the monomer silicon compounds which are raw materials of the gelled silicon compound, one of the compounds may be used alone or two or more of them may be used in combination, for example. As a specific example, the monomer silicon compound may include only the trifunctional silane, only the tetrafunctional silane, or both of the trifunctional silane and the tetrafunctional silane, and may further include other silicon compounds, for example. When two or more kinds of silicon compounds are used as the monomer silicon compound, the ratio between the compounds is not limited to particular values and can be determined appropriately.

Figure 5:
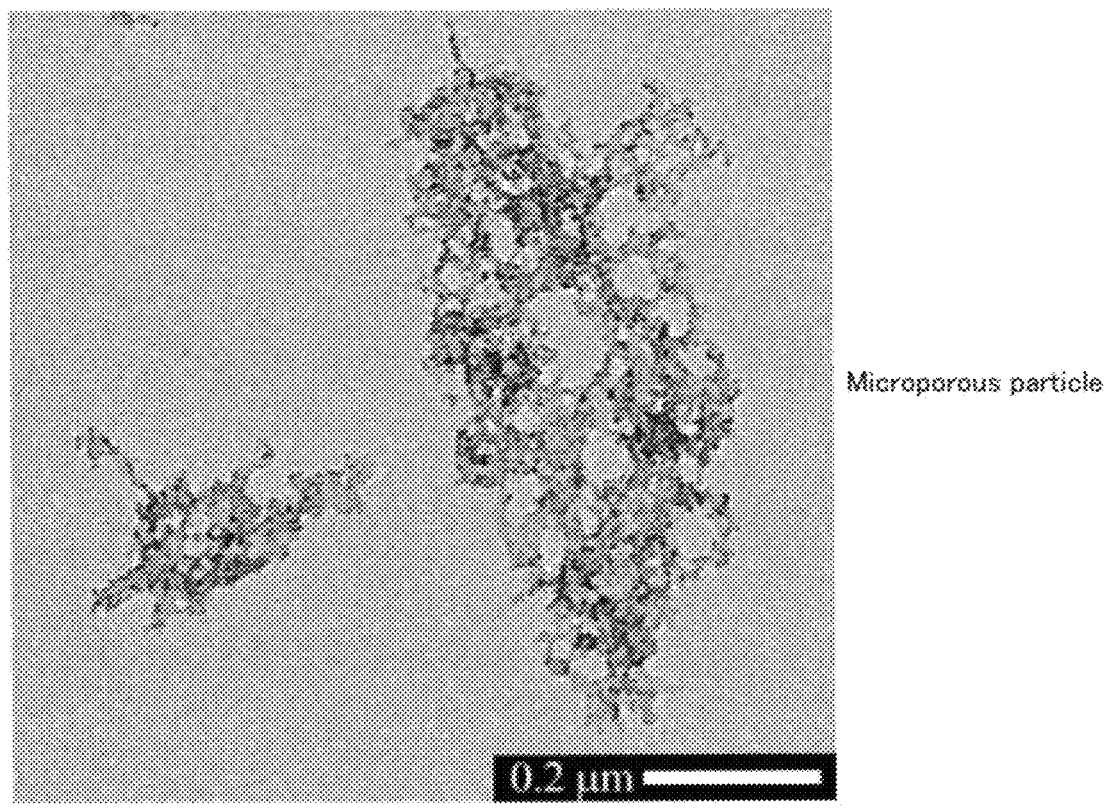
FIG. 5 is a TEM image of a microporous particle in a silicone porous body of the Example.

In the silicone porous body of the present invention, the volume average particle size showing particle size variations of the silicon compound microporous particle (preferably, a pulverized product of a gelled silica compound) is not limited to particular values, and the lower limit thereof is, for example, 0.05 μm or more, 0.10 μm or more, or 0.20 μm or more, the upper limit thereof is, for example, 2.00 μm or less, 1.50 μm or less, or 1.00 μm or less, and the volume average particle size is, for example, in the range from 0.05 μm to 2.00 μm, 0.10 μm to 1.50 μm, or 0.20 μm to 1.00 μm. The particle size distribution can be measured, for example, using a particle size distribution analyzer based on optical centrifugal sedimentation, dynamic light scattering, laser diffraction, or the like or using an electron microscope such as a scanning electron microscope (SEM) or a transmission electron microscope (TEM). The method of measuring the particle size distribution, however, is not limited thereto. In the present invention, the silicon compound microporous particle may definite or indefinite in shape. Preferably, each silicon compound microporous particle has a single or multiple micropors. In the present invention, a preferable form of the silicon compound microporous particle is, for example, as shown in FIG. 5 (TEM image) in the Examples below. FIG. 5 however is an example and does not limit the present invention by any means. In the present invention, the TEM image of the silicon compound microporous particles can be observed, for example, by the method described below.

(Observation of Microporous Particle Using TEM)

In the present invention, the form of the silicon compound microporous particle can be observed and analyzed using a transmission electron microscope (TEM). Specifically, a dispersion liquid of the silicon compound microporous particle is diluted so as to obtain a solution having an appropriate concentration, and the resultant is dispersed on a carbon support and dried to obtain a microporous particle sample. Then, the sample is observed using a TEM (product of Hitachi, Ltd., product name: H-7650, acceleration voltage: 100 kV), and an electron image can be obtained with an observation magnification×100,000.

The particle size distribution showing particle size variations of the silicon compound microporous particle is not limited to particular values. The distribution of the particle having a particle size of 0.4 μm to 1 μm is, for example, 50 wt % to 99.9 wt %, 80 wt % to 99.8 wt %, or 90 wt % to 99.7 wt % or the distribution of the particle having a particle size of 1 μm to 2 μm is 0.1 wt % to 50 wt %, 0.2 wt % to 20 wt %, or 0.3 wt % to 10 wt %, for example. The particle size distribution can be measured, for example, using a particle size distribution analyzer or an electron microscope.

The silicone porous body of the present invention may contain a catalyst for chemically bonding the silicon compound microporous particles, for example. The content of the catalyst is not limited to particular values, and the content of the catalyst relative to the weight of the silicon compound microporous particle is, for example, 0.01 wt % to 20 wt %, 0.05 wt % to 10 wt %, or 0.1 wt % to 5 wt %.

The silicone porous body of the present invention may further contain a crosslinking assisting agent for indirectly bonding the silicon compound microporous particles, for example. The content of the crosslinking assisting agent is not limited to particular values, and the content of the crosslinking assisting agent relative to the weight of the silicon compound microporous particle is, for example, 0.01 wt % to 20 wt %, 0.05 wt % to 15 wt %, or 0.1 wt % to 10 wt %.

The form of the silicone porous body of the present invention is not limited to particular forms, and can be, for example, in the form of a film, a bulk body, or the like.

The method of producing a silicone porous body of the present invention is not limited to particular methods, and the silicone porous body of the present invention can be produced, for example, by the production method of the present invention described below.

[2. Production Method of Silicone Porous Body]

As described above, the method of producing a silicone porous body of the present invention includes steps of: preparing a liquid containing silicon compound microporous particles, adding a catalyst for chemically bonding the microporous particles to the liquid, and chemically bonding the microporous particles by catalysis. The liquid containing the silicon compound microporous particles is not limited to particular liquids, and can be, for example, a suspension containing the silicon compound microporous particles. The silicon compound microporous particle is preferably a pulverized product of a gelled silica compound as described above. The production method is described below mainly with reference to the case where the silicon compound microporous particle is a pulverized product of a gelled silica compound (hereinafter, it may be simply referred to as a "pulverized product"). The method of producing a silicone porous body of the present invention, however, can be performed in the same manner also by using a fine particle other than the pulverized product of a gelled silica compound as the silicon compound microporous particle. Besides the method of using the coating liquid, for example, a silicone porous body may be produced on a base by an aerosol deposition method (AD method) or the like in a dry environment.

The production method of the present invention can provide a silicone porous body having a porous structure with less cracks and a high proportion of void space as well as having a sufficient strength. The following theory about the reason for this can be formed. The present invention, however, is not limited thereto.

Since the pulverized product used in the production method of the present invention is obtained by pulverizing the gelled silicon compound, the three-dimensional structure of the gelled silicon compound before pulverization is dispersed into three-dimensional basic structures. In the production method of the present invention, the three-dimensional basic structures are deposited using a sol containing the pulverized products of the gelled silicon compound, and the porous structure based on the three-dimensional basic structures is formed. That is, according to the production method of the present invention, a new porous structure is formed of the pulverized products each having the three-dimensional basic structure, which is different from the three-dimensional structure of the gelled silicon compound. Moreover, in the production method of the present invention, since the pulverized products are chemically bonded, the new three-dimensional structure is immobilized. Thus, the silicone porous body obtained by the production method of the present invention, despite its structure with void spaces, can maintain a sufficient strength with less cracks. According to the production method of the present invention, for example, the silicone porous body can be formed as a single bulk body, or the silicone porous body can be formed as an additional member to various objects. The silicone porous body obtained by the present invention can be used, as a member utilizing voids, for products in a wide range of fields including optical elements such as low refractive index layers, heat insulating materials, sound absorbing materials, regenerative medical bases, dew condensation preventing materials, and ink image receiving members, and can be used for a method of producing a laminated film having various functions, for example.

Regarding the production method of the present invention, reference can be made to the description as to the silicone porous body of the present invention unless otherwise stated. The present invention can be utilized for production of any gel according to applications and purposes, and is particularly effective for production of a xerogel, for example. As described above, the silicone porous body of the present invention achieves a high proportion of void space as in the case of an aerogel even with a xerogel, for example.

Regarding the gelled silicon compound, the pulverized product thereof, the monomer silicon compound, and the silicon compound precursor in the production method of the present invention, reference can be made to the description as to the silicone porous body of the present invention.

The production method of the present invention includes a step of preparing a liquid containing the silicon compound microporous particles (preferably, sol containing the pulverized products of the gelled silicon compound) as described above. The pulverized product can be obtained, for example, by pulverizing the gelled silicon compound. By pulverization of the gelled silicon compound, as described above, the three-dimensional structure of the gelled silicon compound is destroyed and dispersed into three-dimensional basic structures.

Generation of the gelled silicon compound by gelation of the silicon compound and preparation of the pulverized product by pulverization of the gelled silicon compound are described below. The present invention, however, is not limited thereto.

The gelation of the silicon compound can be performed, for example, by bonding the monomer silicon compounds by a hydrogen bond or an intermolecular bond.

The monomer silicon compound can be, for example, a silicon compound represented by the chemical formula (1) described in the description as to the silicone porous body of the present invention.

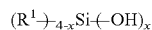     (1)

Since the silicon compound represented by the chemical formula (1) has a hydroxyl group, monomers in the chemical formula (1) can be bonded by a hydrogen bond or an intermolecular bond through their hydroxyl groups, for example.

The silicon compound may be the hydrolysate of the silicon compound precursor as described above, and may be generated by hydrolyzing the silicon compound precursor represented by the chemical formula (2) described in the description as to the silicone porous body of the present invention, for example.

     (2)

The method of hydrolyzing the silicon compound precursor is not limited to particular methods, and can be performed by a chemical reaction in the presence of a catalyst, for example. Examples of the catalyst include acids such as an oxalic acid and an acetic acid. The hydrolysis reaction can be performed, for example, by gradually dropping an oxalic acid aqueous solution to a mixture (for example, suspension) of the silicon compound and dimethylsulfoxide to mix at room temperature, and stirring the resultant for about 30 minutes. In hydrolysis of the silicon compound precursor, for example, by completely hydrolyzing the alkoxy group of the silicon compound precursor, gelation and aging thereafter and heating and immobilization after formation of a void-provided structure can be achieved more efficiently.

The gelation of the monomer silicon compound can be performed, for example, by a dehydration condensation reaction among the monomers. The dehydration condensation reaction is preferably performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst is particularly preferably a base catalyst.

In the dehydration condensation reaction, the amount of the catalyst to be added to the monomer silicon compound is not limited to particular values, and is, for example, 0.1 to 10 mol, 0.05 to 7 mol, or 0.1 to 5 mol per mol of the monomer silicon compound.

The gelation of the monomer silicon compound is preferably performed in a solvent, for example. The proportion of the silicon compound in the solvent is not limited to particular values. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One of the solvents may be used alone or two or more of them may be used in combination, for example. Hereinafter, the solvent used for the gelation is also referred to as a "gelation solvent".

The condition for the gelation is not limited to particular conditions. Regarding the solvent containing the silicon compound, the treatment temperature is, for example, 20° C. to 30° C., 22° C. to 28° C., or 24° C. to 26° C., and the treatment time is, for example, 1 to 60 minutes, 5 to 40 minutes, or 10 to 30 minutes. In the case of performing the dehydration condensation reaction, the treatment condition is not limited to particular conditions and reference can be made to these examples. By gelation, a siloxane bond is grown and silica primary particles are formed. As the reaction further proceeds, the primary particles are connected in the form of a string of beads to generate a gel having a three-dimensional structure, for example.

The gelled silicon compound obtained by the gelation is preferably subjected to aging treatment after the gelation reaction. The aging treatment causes further growth of the primary particles of a gel having a three-dimensional structure obtained by gelation, for example, and this allows the size of the particle itself to be increased. As a result, the contact state of the neck where particles are in contact with each other can be increased from a point contact to a surface contact. The gel which has been subjected to the aging treatment increases its strength, for example, and this increases the strength of the three-dimensional basic structure after pulverization. This prevents, in the drying step after coating of the pulverized product, the pore size of the void-provided structure obtained by deposition of the three-dimensional basic structures from shrinking in accordance with solvent volatilization during the drying process, for example.

The aging treatment can be performed, for example, by incubating the gelled silicon compound at a predetermined temperature for a predetermined time. The predetermined temperature is not particularly limited, and the lower limit thereof is, for example, 30° C. or more, 35° C. or more, or 40° C. or more, the upper limit thereof is, for example, 80° C. or less, 75° C. or less, or 70° C. or less, and the predetermined temperature is, for example, in the range from 30° C. to 80° C., 35° C. to 75° C., or 40° C. to 70° C. The predetermined time is not particularly limited, and the lower limit is, for example, 5 hours or more, 10 hours or more, or 15 hours or more, the upper limit is, for example, 50 hours or less, 40 hours or less, or 30 hours or less, and the predetermined time is, for example, in the range from 5 hours to 50 hours, 10 hours to 40 hours, or 15 hours to 30 hours. An optimal condition for the aging is, for example, the condition mainly aiming for increase in the size of the silica primary particle and increase in the contact area of the neck. Furthermore, it is preferable to take the boiling point of a solvent to be used into consideration. For example, when the aging temperature is too high, there is a possibility that the solvent excessively volatilizes, which causes defectiveness such that the pore of the three-dimensional void-provided structure closes due to the condensation of the concentration of a coating liquid (gel liquid). On the other hand, for example, when the aging temperature is too low, there is a possibility not only that a sufficient effect of the aging is not brought about but also that temperature variations over time in a mass production process increase, which causes products with poor quality to be produced.

The same solvent as the solvent used in the gelation treatment can be used in the aging treatment, for example. Specifically, the aging treatment is preferably applied to a reactant (the solvent containing the gelled silicon) after the gelation treatment. The mol number of residual silanol groups contained in the gel (the gelled silicon compound) after completion of the aging treatment after gelation is, for example, the proportion of the residual silanol group with the mol number of alkoxy groups of the added raw material (for example, the silicon compound precursor) being considered as 100, and the upper limit thereof is, for example, 50% or less, 40% or less, or 30% or less, the lower limit thereof is, for example, 1% or more, 3% or more, or 5% or more, and the mol number is, for example, in the range from 1% to 50%, 3% to 40%, or 5% to 30%. For the purpose of increasing the hardness of a gel, for example, the lower the mol number of the residual silanol groups, the better. When the mol number of the silanol groups is too high, for example, there is a possibility that the void-provided structure cannot be held until crosslinking is done in the precursors of the silicone porous body. On the other hand, when the mol number of the silanol groups is too low, for example, there is a possibility that the precursors of the silicone porous body cannot be crosslinked in the bonding step, which hinders a sufficient strength from being imparted. Note that while the aforementioned description is described with reference to a silanol group as an example, the same phenomenon shall be applied to various functional groups when a monomer silicon compound is modified with various reactive functional groups, for example.

After gelation of the monomer silicon compound in the gelation solvent, the obtained gelled silicon compound is pulverized. The gelled silicon compound in the gelation solvent which has not been processed may be pulverized, or the gelation solvent may be substituted with another solvent and the gelled silicon compound in the substituted solvent may be pulverized, for example. Furthermore, if the catalyst and solvent used in the gelation reaction remain after the aging step, which causes gelation of the liquid over time (pot life) and decreases the drying efficiency in the drying step, it is preferable to substitute the gelation solvent with another solvent. Hereinafter, this another solvent may be also referred to as a "pulverization solvent".

The pulverization solvent is not limited to particular solvents, and can be, for example, an organic solvent. The organic solvent can be, for example, a solvent having a boiling point at 130° C. or less, 100° C. or less, or 85° C. or less. Specific examples of the organic solvent include isopropyl alcohol (IPA), ethanol, methanol, butanol, propylene glycol monomethyl ether (PGME), methyl cellosolve, acetone, and dimethylformamide (DMF). One of the pulverization solvents may be used alone or two or more of them may be used in combination.

The combination of the gelation solvent and the pulverization solvent is not limited to particular combinations, and the combination can be, for example, the combination of DMSO and IPA, the combination of DMSO and ethanol, the combination of DMSO and methanol, and the combination of DMSO and butanol. Substitution of the gelation solvent with the pulverization solvent makes it possible to form a coating film with uniform quality in the coating film formation described below, for example.

The method of pulverizing the gelled silicon compound is not limited to particular methods, and a high pressure medialess pulverizing apparatus is preferably used. Examples of the apparatus for pulverizing include: wet-type medialess pulverizing apparatuses utilizing a cavitation phenomenon such as an ultrasonic homogenizer, a high-speed rotating homogenizer, and a high pressure extrusion pulverizing apparatus; and pulverizing apparatuses of causing oblique collision of liquids at a high pressure. An apparatus such as a ball mill that performs media pulverization physically destroys the void-provided structure of a gel in pulverization, for example. On the other hand, a cavitation-type pulverizing apparatus such as a homogenizer, which is preferable in the present invention, peels the contact surface of silica sol particles, which are already contained in a gel three-dimensional structure and bonded relatively weakly, with a high pressure and a high speed shearing force by a medialess method without causing physical destruction phenomenon of a medium. Thus, a sol three-dimensional structure to be obtained can hold the void-provided structure having a particle size distribution of a certain range of a submicron region and can form the void-provided structure again by deposition in coating and drying, for example. The condition for the pulverization is not limited to particular conditions, and is preferably a condition that allows a gel to be pulverized without volatilizing a solvent by instantaneously imparting a high speed flow, for example. For example, it is preferable to pulverize the gelled silicon compound so as to obtain pulverized products having the above described particle size variations (for example, volume average particle size or particle size distribution). If the pulverization time, the pulverization strength, or the like is lacking, for example, there is a possibility not only that coarse particles remain, which hinders dense pores from being formed but also that defects in appearance increase, which hinders high quality from being achieved. On the other hand, if the pulverization time, the pulverization strength, or the like is too much, for example, there is a possibility that a finer sol particle than a desired particle size distribution is obtained and the size of a void space deposited after coating and drying is too fine to satisfy a desired porosity.

In the manner described above, a liquid (for example, suspension) containing the microporous particles (pulverized products of a gelled silicon compound) can be prepared. By further adding a catalyst for chemically bonding the microporous particles after or during the preparation of the liquid containing the microporous particles, a liquid containing the microporous particles and the catalyst can be prepared. The amount of the catalyst to be added is not limited to particular values, and the amount of the catalyst to be added relative to the weight of the microporous particle (pulverized product of the gelled silicon compound) is, for example, in the range from 0.01 wt % to 20 wt %, 0.05 wt % to 10 wt %, or 0.1 wt % to 5 wt %. This catalyst chemically bonds the microporous particles in the bonding step described below, for example. The catalyst may be, for example, a catalyst that promotes the crosslinking bond among the microporous particles. As the chemical reaction of chemically bonding the microporous particles, it is preferable to utilize the dehydration condensation reaction of a residual silanol group contained in a silica sol molecule. By promoting the reaction between the hydroxyl groups of the silanol group by the catalyst, the continuous formation of a film in which the void-provided structure is cured in a short time can be performed. Examples of the catalyst include photoactive catalysts and thermoactive catalysts. The photoactive catalyst allows the chemical bond (for example, crosslinking bond) among the microporous particles without heating, for example. This makes it possible to maintain a higher proportion of void space because the shrinkage due to heating is less liable to occur, for example. In addition to or instead of the catalyst, a substance (catalyst generator) that generates a catalyst may be used. For example, the catalyst may be a crosslinking reaction accelerator and the catalyst generator may be a substance that generates the crosslinking reaction accelerator. For example, in addition to or instead of the photoactive catalyst, a substance (photocatalyst generator) that generates a catalyst by light irradiation may be used. For example, in addition to or instead of the thermoactive catalyst, a substance (thermal catalyst generator) that generates a catalyst by heating may be used. The photocatalyst generator is not limited to particular photocatalyst generators, and examples thereof include photobase generators (substances that generate basic catalysts by light irradiation) and photoacid generators (substances that generate acidic catalysts by light irradiation). Among them, the photobase generator is preferable. Examples of the photobase generator include 9-anthrylmethyl N, N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5,5-tetramethylbiguanidium n-butyltriphenylborate (product name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd. Examples of the photoacid generator include aromatic sulfonium salt (product of ADEKA, product name: SP-170), triarylsulfonium salt (product of San-Apro Ltd., product name: CPI101A), and aromatic iodonium salt (product of Ciba Japan, product name: Irgacure 250). The catalyst for chemically bonding the microporous particles is not limited to the photoactive catalyst and the photocatalyst generator, and can be, for example, a thermoactive catalyst or a thermal catalyst generator such as urea. Examples of the catalyst for chemically bonding the microporous particles include base catalysts such as potassium hydroxide, sodium hydroxide, and ammonium hydroxide; and acid catalysts such as a hydrochloric acid, an acetic acid, and an oxalic acid. Among them, the base catalyst is preferable. The catalyst for chemically bonding the microporous particles can be used by adding it to a sol particle liquid (for example, suspension) containing the pulverized products (microporous particles) right before the coating, or the catalyst can be used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents, and examples thereof include various organic solvents, water, and buffer solutions.

For example, in the case where the silicon compound microporous particle is a pulverized product of a gelled silicon compound obtained from a silicon compound containing at least three or less functional groups having saturated bonds, a crosslinking assisting agent for indirectly bonding the silicon compound microporous particles may further be added after or during preparation of a liquid containing the silicon compound microporous particles. This crosslinking assisting agent penetrates among particles and interacts with or bonds to the particles, which helps to bond particles relatively distanced from one another and makes it possible to increase the strength efficiently. As the crosslinking assisting agent, a multicrosslinking silane monomer is preferable. Specifically, the multicrosslinking silane monomer may have at least two and at most three alkoxysilyl groups, the chain length between the alkoxysilyl groups may be 1-10 C, and the multicrosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not limited to particular values, and the amount of the crosslinking assisting agent to be added relative to the weight of the silicon compound microporous particle is, for example, in the range from 0.01 wt % to 20 wt %, 0.05 wt % to 15 wt %, or 0.1 wt % to 10 wt %.

The silicone porous body can be formed by forming a coating film using a liquid containing the silicon compound microporous particles (preferably, sol containing pulverized products of the gelled silicon compound), for example. The coating of the base with the silicon compound microporous particles can be performed, for example, by the various coating methods described below but not limited thereto. By directly coating the base with the solvent containing the pulverized products, the coating film can be formed. The precursor of the porous body, which is the coating film before the bonding step described below, can be also referred to as a precursor film (or precursor layer) of the silicone porous body of the present invention, for example. Formation of the coating film causes the settlement and deposition of the pulverized product whose three-dimensional structure has been destroyed, for example, and this allows a new three-dimensional structure to be formed.

The solvent (hereinafter, also referred to as a "coating solvent") is not limited to particular solvents, and can be, for example, an organic solvent. The organic solvent can be, for example, a solvent having a boiling point at 130° C. or less. Specific examples of the solvent include IPA, ethanol, methanol, and butanol, and the examples of the pulverization solvent described above can be used. In the case where the present invention includes a step of pulverizing the gelled silicon compound, for example, the pulverization solvent containing the pulverized products of the gelled silicon compound can be used without processing in the coating film forming step.

In the coating film forming step, for example, it is preferable to coat the base with the sol silicon compound microporous particles dispersed in the solvent (hereinafter, referred to as a "sol particle liquid"). After coating the base with the sol particle liquid of the present invention and drying it, by chemically crosslinking the particles in the bonding step, the continuous formation of a void-provided layer having a strength of a certain level or more can be performed. The "sol" in the present invention denotes a fluidic state in which silica sol particles each having a nano three-dimensional structure holding a part of the void-provided structure are dispersed in a solvent by pulverization of the three-dimensional structure of a gel.

The concentration of the silicon compound microporous particle in the solvent is not limited to particular values, and is, for example, in the range from 0.3% to 80% (v/v), 0.5% to 40% (v/v), or 1.0% to 10% (v/v). When the concentration of the pulverized product is too high, there is a possibility that the fluidity of the sol particle liquid decreases significantly, which causes aggregates and coating stripes in coating, for example. On the other hand, when the concentration of the silicon compound microporous particle is too low, there is a possibility not only that the drying of the sol particle solvent takes a relatively long time but also that the residual solvent right after the drying increases, which may decrease the porosity, for example.

There is no particular limitation on the physical property of the sol particle liquid. The shear viscosity of the sol particle liquid is, for example, 100 cPa·s or less, 10 cPa·s or less, or 1 cPa·s or less, for example, at the shear rate of 1000 1/s. When the shear viscosity is too high, for example, there is a possibility that the coating stripes are generated, which causes defectiveness such as decrease in the transfer rate in the gravure coating. In contrast, when the shear viscosity is too low, for example, there is a possibility that the thickness of the wet coating during coating cannot be increased and a desired thickness cannot be obtained after drying.

The coating amount of the silicon compound microporous particle relative to the base is not limited to particular values, and can be determined appropriately, for example, according to the thickness of a desired silicone porous body. As a specific example, in the case of forming the silicone porous body having a thickness of 0.1 to 1000 μm, the coating amount of the pulverized product relative to the base is, for example, in the range from 0.01 to 60000 g, 0.1 to 5000 g, or 1 to 50 g per square meter of the base. Although it is difficult to uniquely define a preferable coating amount of the sol particle liquid because it depends on the concentration of a liquid, the coating method, or the like, for example, it is preferable that a coating layer is as thin as possible in consideration of productivity. When the coating amount is too much, for example, there is a high possibility that a solvent is dried in a drying oven before volatilizing. When the solvent is dried before forming the void-provided structure by the settlement and deposition of the nano pulverized sol particles in the solvent, there is a possibility that formation of void spaces is inhibited and the proportion of void space decreases. On the other hand, when the coating amount is too little, there is a possibility of increasing the risk of causing coating cissing due to unevenness of a base, variations in hydrophilicity and hydrophobicity, and the like.

After coating the base with the pulverized product, drying treatment may be applied to the coating film. The drying treatment of the present invention is characterized in that the treatment can be applied from a relatively low temperature, and is suitable for a quick continuous production. The drying treatment is aimed not only for removing the solvent (solvent contained in the sol particle liquid) from the coating film but also for causing the settlement and deposition of the sol particles to form a void-provided structure in the drying treatment, for example. The temperature for the drying treatment is, for example, in the range from 50° C. to 200° C., 60° C. to 150° C., or 70° C. to 130° C., and the time for the drying treatment is, for example, in the range from 0.1 to 30 minutes, 0.2 to 10 minutes, or 0.3 to 3 minutes. Regarding the temperature and time for the drying treatment in relation to continuous productivity and high porosity expression, the lower the better and the shorter the better, for example. When the condition is too strict, there is a possibility of causing the following problems, for example. That is, when the base is a resin film, for example, the base extends in a drying oven as the temperature approaches the glass-transition temperature of the base, which causes defects such as cracks in a formed void-provided structure right after coating. On the other hand, when the condition is too mild, there is a possibility of causing the following problems, for example. That is, since the film contains a residual solvent when it comes out of the drying oven, defects in appearance such as scratches are caused when the film rubs against a roller in the next step.

The drying treatment may be, for example, natural drying, drying by heating, or drying under reduced pressure. There is no particular limitation on the drying method and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto. The temperature and time for the drying treatment can be changed depending on the thickness of an intended silanol porous body, the type of the solvent, and the like.

The base is not limited to particular bases, and a porous body having no base and a porous body formed on a base can be formed properly depending on the configuration of an intended silanol porous body. For example, a base made of thermoplastic resin, a base made of glass, an inorganic base typified by silicon, plastic molded using thermosetting resin or the like, an element such as a semiconductor, a carbon fiber material typified by carbon nanotube, or the like can be preferably used. The base, however, is not limited thereto. Examples of the form of the base include a film and a plate. Examples of thermoplastic resin include bases having high transparency such as polyethylene terephthalate (PET), acryl, cellulose acetate propionate (CAP), cycloolefin polymer (COP), triacetate (TAC), polyethylene naphthalate (PEN), polyethylene (PE), and polypropylene (PP).

In the production method of the present invention, the bonding step is a step of chemically bonding the silicon compound microporous particles contained in the coating film, and either wet-type treatment or dry-type treatment will do. The three-dimensional structure of the silicon compound microporous particle in the precursor of the porous body is immobilized in the bonding step, for example. In the case of immobilizing the three-dimensional structure by conventional sintering, for example, the dehydration condensation of a silanol group and the formation of a siloxane bond are induced by high temperature treatment at 200° C. or more. In the bonding step of the present invention, for example, when a base is a resin film, wet-type treatment can be performed at about 100° C. which is relatively low for less than several minutes which is short without damaging the base by causing various additives, which catalyze the dehydration condensation reaction, to react. Ultraviolet irradiation may be performed after the drying step to conduct a bonding reaction by quick dry-type treatment utilizing photocatalysis, and this allows the void-provided structure to be formed and immobilized continuously. The wet-type treatment is advantageous in that it only needs a hot air drying step because it causes a crosslinking reaction while forming the coating film, whereas is disadvantageous in that a high proportion of void space is less likely achieved because it causes a crosslinking reaction while forming the void-provided structure. The same kinds of phenomena are expected also in the case of causing the bonding reaction by immersing a formed void-provided structure in a catalyst solution. On the other hand, the dry-type treatment, which causes a crosslinking reaction after forming a high void-provided structure of a silanol precursor (two-step reaction), is advantageous in that formation of a high void-provided structure is less likely inhibited. It is preferable to properly use the wet-type treatment and the dry-type treatment according to the purpose.

The method of chemically bonding the particles is not limited to particular methods, and can be determined appropriately according to the type of the gelled silicon compound, for example. Specifically, for example, the chemical bond can be a chemical crosslinking bond among the silicon compound microporous particles. Besides this, for example, when inorganic particles such as titanium oxide particles are added to the silicon compound microporous particles, the inorganic particles and the silicon compound microporous particles can be chemically bonded by crosslinking. Furthermore, there are a case of using a biocatalyst such as an enzyme and a case of chemically crosslinking the pulverized product and a catalyst at a site which is different from a catalytic activity site. Thus, the present invention can be applied not only to a void-provided layer (silicone porous body) formed of the sol particles but also to an organic-inorganic hybrid void-provided layer, a host-guest void-provided layer, and the like, for example. The present invention, however, is not limited thereto.

The bonding step can be carried out by a chemical reaction in the presence of a catalyst according to the type of the silicon compound microporous particle, for example. The chemical reaction in the present invention is preferably a reaction utilizing a dehydration condensation reaction of a residual silanol group contained in a silica sol molecule. By promoting the reaction between the hydroxyl groups of the silanol group by the catalyst, the continuous formation of a film in which the void-provided structure is cured in a short time can be performed. Silicon monomer materials organically modified with other reactive functional groups however may be used as silica gel materials, and the functional group reacted in the bonding step is not limited to the silanol group. Examples of the catalyst include base catalysts such as potassium hydroxide, sodium hydroxide, and ammonium hydroxide, and acid catalysts such as a hydrochloric acid, an acetic acid, and an oxalic acid. The catalyst, however, is not limited thereto. The catalyst used in the dehydration condensation reaction is preferably a base catalyst. Furthermore, photoacid generation catalysts, photobase generation catalysts, photoacid generators, photobase generators, and the like, each of which expresses a catalytic activity by light (for example, ultraviolet) irradiation, may preferably be used. The photoacid generation catalysts, photobase generation catalysts, photoacid generators, and photobase generators are not limited to particular catalysts, and can be, for example, as described above. Preferably, as described above, the catalyst is used by adding it to a sol particle liquid containing the pulverized products right before the coating or the catalyst is used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents as described above, and examples thereof include various organic solvents, water, and buffer solutions.

The chemical reaction in the presence of the catalyst can be performed, for example, by heating the coating film containing the catalyst preliminarily added to the sol particle liquid or irradiating the coating film containing the catalyst preliminarily added to the sol particle liquid with light, by heating the coating film or irradiating the coating film with light after the catalyst has been sprayed to the coating film, or by heating the coating film or irradiating the coating film with light while spraying the catalyst to the coating film. For example, when the catalyst is a photoactive catalyst, the porous body can be formed by chemically bonding the microporous particles by light irradiation. When the catalyst is a thermoactive catalyst, the porous body can be formed by chemically bonding the microporous particles by heating. The accumulated light amount in the light irradiation is not limited to particular values, and is, for example, 200 to 800 $mJ/cm^2$, 250 to 600 $mJ/cm^2$, or 300 to 400 $mJ/cm^2$ in terms of the wave length of 360 nm. From the view point of preventing the effect from being insufficient due to the delay of decomposition of the catalyst by light absorption because of insufficient irradiation amount, the accumulated light amount is preferably 200 mJ/cm² or more. From the view point of preventing heat wrinkles from generating due to the damage on a base below a void-provided layer, the accumulated light amount is preferably 800 mJ/cm² or less. The conditions for the heat treatment are not limited to particular conditions. The heating temperature is, for example, 50° C. to 250° C., 60° C. to 150° C., or 70° C. to 130° C., the heating time is, for example, 0.1 to 30 minutes, 0.2 to 10 minutes, or 0.3 to 3 minutes. The solvent to be used is preferably a solvent having a low surface tension in view of reducing the shrinkage stress in accordance with the solvent volatilization in drying and reducing the crack phenomenon of the void-provided layer due to the shrinkage stress, for example. The solvent can be, for example, lower alcohol typified by isopropyl alcohol (IPA), hexane, perfluorohexane, or the like. The solvent, however, is not limited thereto. For example, the surface tension of the solvent may be reduced by adding a small amount of perfluoro surfactant or silicon surfactant to the IPA.

In the manner described above, the silicone porous body of the present invention can be produced. The production method of the present invention, however, is not limited thereto.

The thus obtained silicone porous body of the present invention may be subjected to a strength increasing step (hereinafter, also referred to as an "aging step") of applying thermal aging to increase the strength, for example. For example, when the silicone porous body of the present invention is stacked on a resin film, the peel strength to the resin film can be increased by the strength increasing step (aging step). In the strength increasing step (aging step), for example, the silicone porous body of the present invention may be heated. The temperature of the aging step is, for example, 40° C. to 70° C., 45° C. to 65° C., or 50° C. to 60° C. The time for the aging step is, for example, 10 to 30 hours, 13 to 25 hours, or 15 to 20 hours. By setting the heating temperature low in the aging step, for example, the peel strength can be increased while reducing the shrinkage of the silicone porous body, thereby achieving both a high proportion of void space and a strength.

While the phenomenon and mechanism caused in the strength increasing step (aging step) are unknown, for example, it is considered that the catalyst contained in the silicone porous body of the present invention promotes the chemical bond (for example, crosslinking reaction) among the microporous particles, thereby increasing the strength. As a specific example, when the microporous particles are silicon compound microporous particles (for example, pulverized products of a gelled silica compound) and residual silanol groups (OH groups) are present in the silicone porous body, it is considered that the residual silanol groups are chemically bonded by a crosslinking reaction. The catalyst contained in the silicone porous body of the present invention is not limited to particular catalysts, and can be, for example, a catalyst used in the bonding step, a basic substance generated by the photobase generation catalyst used in the bonding step by light irradiation, or an acidic substance generated by the photoacid generation catalyst used in the bonding step by light irradiation. The description, however, is illustrative and does not limit the present invention.

A pressure-sensitive adhesive/adhesive layer may additionally be formed on the silicone porous body of the present invention (pressure-sensitive adhesive/adhesive layer forming step). Specifically, for example, the pressure-sensitive adhesive/adhesive layer may be formed by applying a pressure-sensitive adhesive or an adhesive to the silicone porous body of the present invention. The pressure-sensitive adhesive/adhesive layer may be formed on the silicone porous body of the present invention using an adhesive tape in which the pressure-sensitive adhesive/adhesive layer stacked on a base by adhering the pressure-sensitive adhesive/adhesive layer side of the adhesive tape on the silicone porous body of the present invention. In this case, the base of the adhesive tape may be kept adhered or peeled from the pressure-sensitive adhesive/adhesive layer. In the present invention, a "pressure-sensitive adhesive" and a "pressure-sensitive adhesive layer" are used based on the premise that an adherend is re-peelable, for example. In the present invention, an "adhesive" and an "adhesive layer" are used based on the premise that an adherend is not re-peelable, for example. In the present invention, however, the "pressure-sensitive adhesive" and the "adhesive" are not always distinguishable and the "pressure-sensitive adhesive layer" and the "adhesive layer" are not always distinguishable. In the present invention, there is no particular limitation on the pressure-sensitive adhesives or the adhesives for forming the pressure-sensitive adhesive/adhesive layer, and a common pressure-sensitive adhesive or adhesive can be used, for example. Examples of the pressure-sensitive adhesive and the adhesive include polymer adhesives such as acrylic adhesives, vinyl alcohol adhesives, silicone adhesives, polyester adhesives, polyurethane adhesives, and polyether adhesives; and rubber adhesives. Furthermore, the pressure-sensitive adhesive and the adhesive can be an adhesive including a water-soluble crosslinking agent of vinyl alcohol polymer such as glutaraldehyde, melamine, or an oxalic acid. One type of the pressure-sensitive adhesives and adhesives may be used alone or two or more types of them may be used in combination (for example, mixing, lamination, and the like). The thickness of the pressure-sensitive adhesive/adhesive layer is not limited to particular values, and is, for example, 0.1 to 100 μm, 5 to 50 μm, 10 to 30 μm, or 12 to 25 μm.

Furthermore, an intermediate layer may be formed between the silicone porous body of the present invention and the pressure-sensitive adhesive/adhesive layer by causing the silicone porous body of the present invention to react with the pressure-sensitive adhesive/adhesive layer (intermediate layer forming step). Owing to the intermediate layer, the silicone porous body of the present invention and the pressure-sensitive adhesive/adhesive layer are not easily peeled from each other, for example. reason (mechanism) for this is unknown, it is presumed that the silicone porous body of the present invention and the pressure-sensitive adhesive/adhesive layer are not easily peeled from each other owing to the anchoring property (anchor effect) of the intermediate layer, for example. The anchoring property (anchor effect) is a phenomenon (effect) that the interface between the void-provided layer and the intermediate layer is strongly fixed because the intermediate layer is entangled in the void-provided layer in the vicinity of the interface. This reason (mechanism), however, is an example of a presumable reason (mechanism), and does not limit the present invention. The reaction between the silicone porous body of the present invention and the pressure-sensitive adhesive/adhesive layer is not limited to particular reactions, and can be, for example, a reaction by catalysis. The catalyst may be a catalyst contained in the silicone porous body of the present invention, for example. Specifically, the catalyst can be, for example, a catalyst used in the bonding step, a basic substance generated by the photobase generation catalyst used in the bonding step by light irradiation, or an acidic substance generated by the photoacid generation catalyst used in the bonding step by light irradiation. The reaction between the silicone porous body of the present invention and the pressure-sensitive adhesive/adhesive layer may be, for example, a reaction (for example, crosslinking reaction) that generates a new chemical bond. The temperature of the reaction is, for example, 40° C. to 70° C., 45° C. to 65° C., or 50° C. to 60° C. The time for the aging step is, for example, 10 to 30 hours, 13 to 25 hours, or 15 to 20 hours. This intermediate layer forming step may also serve as the strength increasing step (aging step) of increasing the strength of the silicone porous body of the present invention.

The thus obtained silicone porous body of the present invention may further be stacked on another film (layer) to form a laminate having the porous structure, for example. In this case, the components of the laminate may be stacked through a pressure-sensitive adhesive or an adhesive, for example.

The components may be stacked by continuous treatment (so called Roll to Roll) using a long film, for example, in terms of efficiency. When the base is a molded product, an element, or the like, the base that has been subjected to a batch process may be stacked.

The method of forming the silicone porous body of the present invention on a base is described below with reference to a continuous treatment process using FIGS. 1 to 3 as an example. FIG. 2 shows a step of adhering a protective film to a formed film of the silicone porous body and winding the laminate. In the case of stacking the silicone porous body on another functional film, the aforementioned method may be adopted or the formed film of the silicone porous body may be adhered to another functional film that has been coated and dried, right before winding. The method of forming a film shown in FIG. 2 is an example, and the present invention is not limited thereto.

Figure 2:
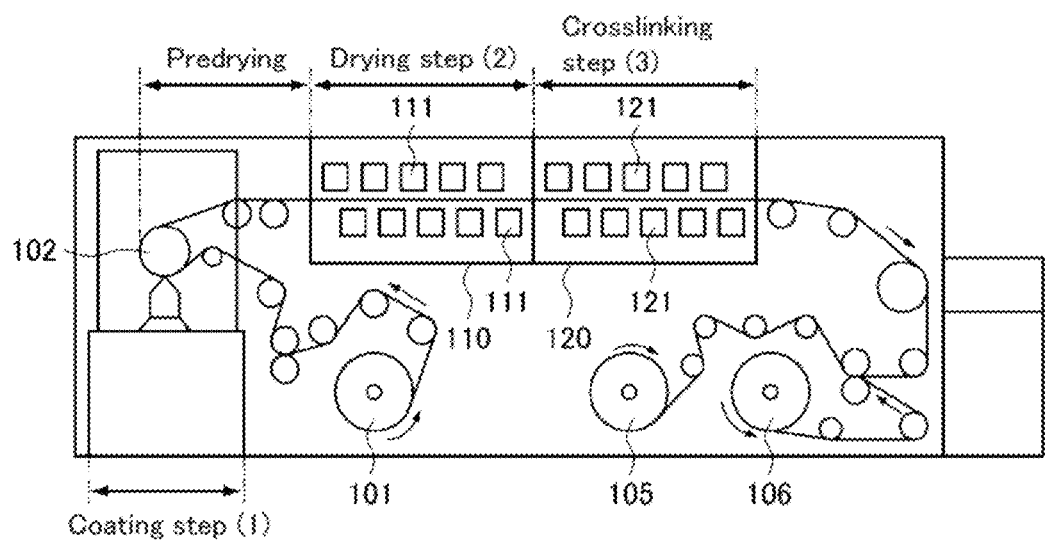
FIG. 2 is an illustration schematically showing an example of a part of the process of producing a silicone porous body of the present invention and an example of the apparatus used therefore.

FIG. 1 is a cross sectional view schematically showing an example of the process of forming the silicone porous body on the base. In FIG. 1, the method of forming a silicone porous body includes: (1) a coating step of coating a base 10 with a sol particle liquid 20" containing silicon compound microporous particles; (2) a coating film forming step (drying step) of drying the sol particle liquid 20" to form a coating film 20' which is a precursor layer of the silicone porous body; and (3) a chemical treatment step (for example, a crosslinking treatment step) of applying chemical treatment (for example, crosslinking treatment) to the coating film 20' to form a silicone porous body 20. In this manner, as shown in FIG. 1, the silicone porous body 20 can be formed on the base 10. The method of forming a silicone porous body may include steps other than the steps (1) to (3) appropriately.

In the coating step (1), the method of coating the base with the sol particle liquid 20" is not limited to particular methods, and a common method can be adopted. Examples of the method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, and the like, an extrusion coating method, a curtain coating method, a roller coating method, a micro-gravure coating method, and the like are preferable. The coating amount of the sol particle liquid 20" is not limited to particular values, and can be determined appropriately so as to obtain a porous structure (silicone porous body) 20 having an appropriate thickness, for example. The thickness of the porous structure (silicone porous body) 20 is not limited to particular values, and is, for example, as described above.

In the (2) drying step, the sol particle liquid 20" is dried (i.e., dispersion medium contained in sol particle liquid 20" is removed) to form a coating film (precursor layer) 20'. There is no particular limitation on the condition for the drying treatment, and is as described above.

In the (3) chemical treatment step, the coating film 20' containing the catalyst (for example, photoactive catalyst or thermoactive catalyst such as KOH) which has been added before coating is irradiated with light or heated to chemically bond (for example, crosslink) the pulverized products in the coating film (precursor) 20', thereby forming a silicone porous body 20. The conditions for the light irradiation and heating in the (3) chemical treatment step are not limited to particular conditions, and are as described above.

FIG. 2 schematically shows an example of a slot die coating apparatus and an example of the method of forming a silicone porous body using the same. Although FIG. 2 is a cross sectional view, hatching is omitted for viewability.

As shown in FIG. 2, the steps of the method using this apparatus are carried out while carrying a base 10 in one direction by rollers. The carrying speed is not limited to particular values, and is, for example, in the range from 1 to 100 m/min, 3 to 50 m/min, or 5 to 30 m/min.

First, the base 10 is delivered from a delivery roller 101 and carried to a coating roller 102, and the (1) coating step of coating the base 10 with a sol particle liquid 20" is carried out using the coating roller 102. Subsequently, the (2) drying step is carried out in an oven zone 110. In the coating apparatus shown in FIG. 2, a predrying step is carried out after the (1) coating step and before the (2) drying step. The predrying step can be carried out at room temperature without heating. In the (2) drying step, a heating unit 111 is used. As the heating unit 111, as described above, a hot air fan, a heating roll, a far-infrared heater, or the like can be used appropriately. For example, the (2) drying step may be divided into multiple steps, and the drying temperature may be set higher as coming to later steps.

The (3) chemical treatment step is carried out in a chemical treatment zone 120 after the (2) drying step. In the (3) chemical treatment step, for example, when the coating film 20' after drying contains a photoactive catalyst, light is emitted from lamps (light irradiation units) 121 disposed above and below the base 10. On the other hand, for example, when the coating film 20' after drying contains a thermoactive catalyst, the base 10 is heated using hot air fans 121 disposed above and below the base 10 instead of using the lamps (light irradiation devices) 121. By this crosslinking treatment, the pulverized products in the coating film 20' are chemically bonded, and the silicone porous body 20 is cured and strengthened. Instead of the hot air fans, ultraviolet irradiators can be preferably used. After the (3) chemical treatment step, a laminate in which the silicone porous body 20 is formed on the base 10 is wound by a winding roller 105. In FIG. 2, the silicone porous body 20, which is a laminate, is protected by coating with a protecting sheet delivered from a roller 106. Instead of the protecting sheet, another layer formed of a long film may be stacked on the porous structure 20.

Figure 3:
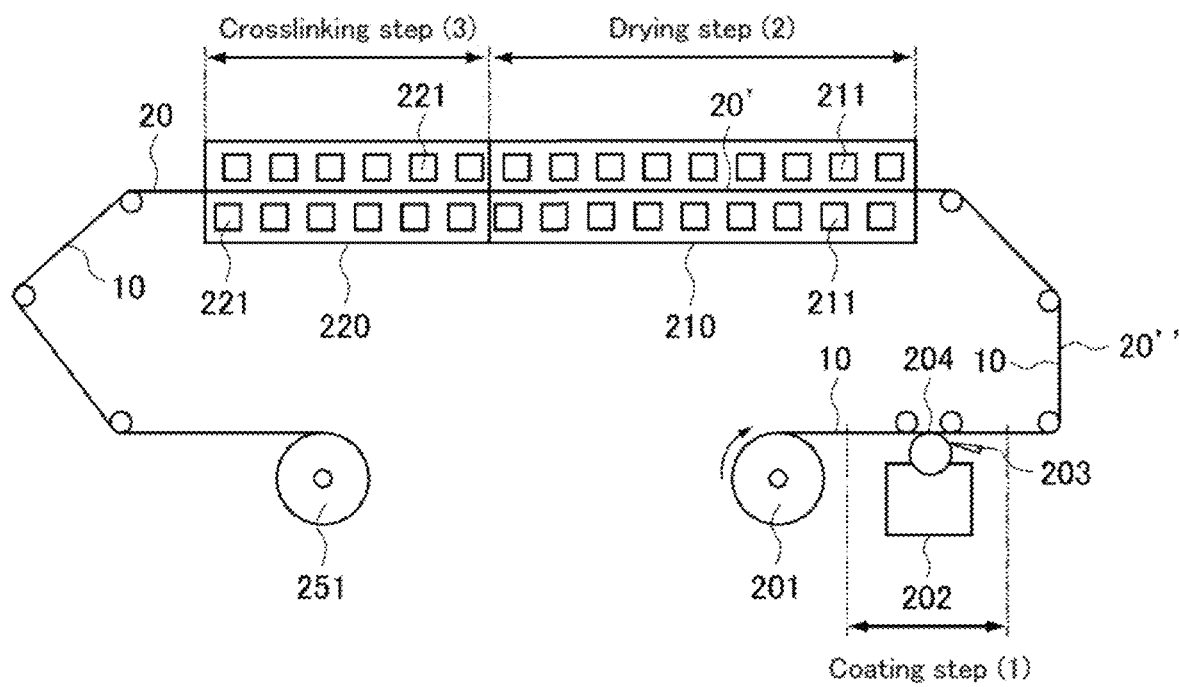
FIG. 3 is an illustration schematically showing another example of a part of the process of producing a silicone porous body of the present invention and another example of the apparatus used therefore.

FIG. 3 schematically shows an example of a micro-gravure coating apparatus and an example of the method of forming a porous structure using the same. Although FIG. 3 is a cross sectional view, hatching is omitted for viewability.

As shown in FIG. 3, the steps of the method using this apparatus are carried out while carrying the base 10 in one direction by rollers as in FIG. 2. The carrying speed is not limited to particular values, and is, for example, in the range from 1 to 100 m/min, 3 to 50 m/min, or 5 to 30 m/min.

First, the (1) coating step of coating the base 10 with a sol particle liquid 20" is carried out while carrying the base 10 delivered from a delivery roller 201. As shown in FIG. 3, the coating with the sol particle liquid 20" is performed using a liquid reservoir 202, a doctor (doctor knife) 203, and a micro-gravure 204. Specifically, the sol particle liquid 20" in the liquid reservoir 202 is applied to the surface of the micro-gravure 204 and the coating of the surface of the base 10 is performed using the micro-gravure 204 while controlling the thickness to a predetermined thickness using a doctor 203. The micro-gravure 204 is merely illustrative. The present invention is not limited thereto, and any other coating unit may be adopted.

Subsequently, the (2) drying step is performed. Specifically, as shown in FIG. 3, the base 10 coated with the sol particle liquid 20" is carried into an oven zone 210 and dried by heating using heating units 211 disposed in the oven zone 210. The heating units 211 can be, for example, the same as those shown in FIG. 2. For example, the (2) drying step may be divided into multiple steps by dividing the oven zone 210 into multiple sections, and the drying temperature may be set higher as coming to later steps. The (3) chemical treatment step is carried out in a chemical treatment zone 220 after the (2) drying step. In the (3) chemical treatment step, for example, when the coating film 20' after drying contains a photoactive catalyst, light is emitted from lamps (light irradiation units) 221 disposed above and below the base 10. On the other hand, for example, when the coating film 20' after drying contains a thermoactive catalyst, the base 10 is heated using hot air fans (heating units) 221 disposed below the base 10 instead of using the lamps (light irradiation devices) 221. By this crosslinking treatment, the pulverized products in the coating film 20' are chemically bonded, and the silicone porous body 20 is formed.

After the (3) chemical treatment step, a laminate in which the silicone porous body 20 is formed on the base 10 is wound by a winding roller 251. Thereafter, for example, another layer may be stacked on the laminate. Furthermore, another layer may be stacked on the laminate before winding the laminate by the winding roller 251, for example.

Figure 6:
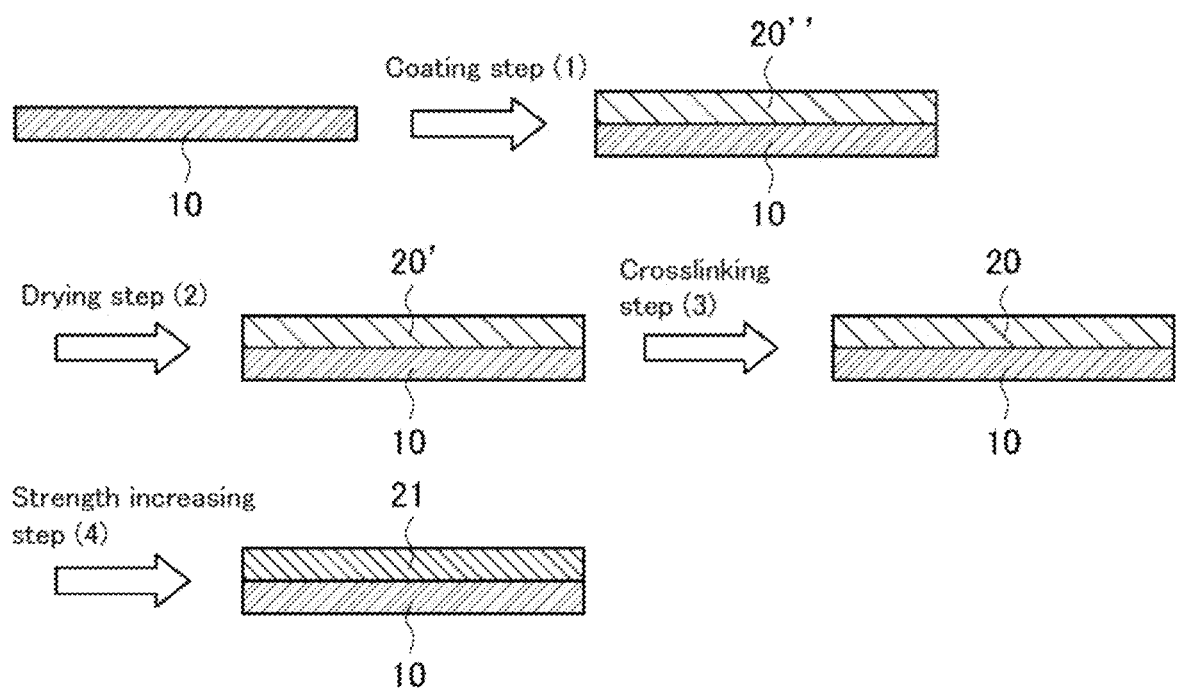
FIG. 6 is a process cross sectional view schematically showing another example of the method of forming a silicone porous body on a base in the present invention.
Figure 7:
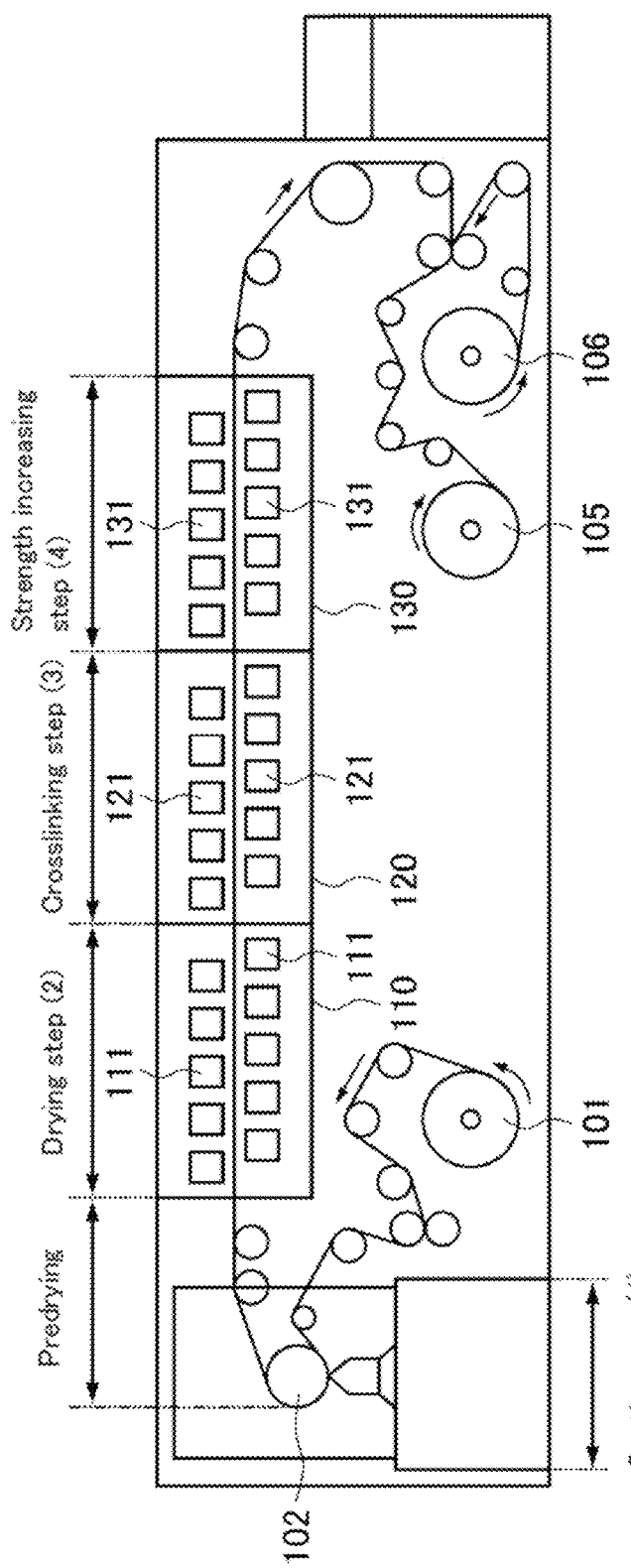
FIG. 7 is an illustration schematically showing still another example of a part of the process of producing a silicone porous body of the present invention and still another example of the apparatus used therefore.
Figure 8:
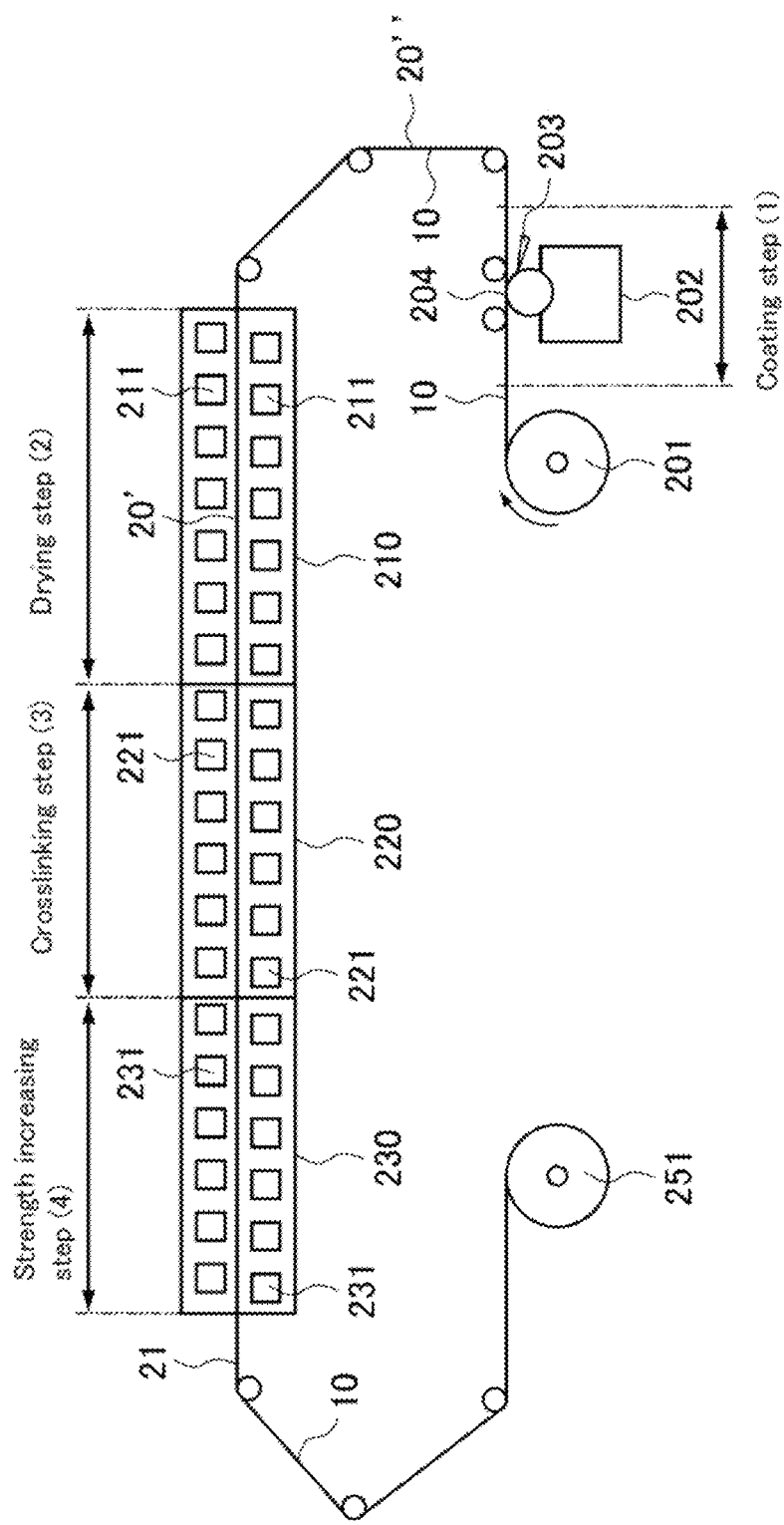
FIG. 8 is an illustration schematically showing still another example of a part of the process of producing a silicone porous body of the present invention and still another example of the apparatus used therefore.

FIGS. 6 to 8 show another example of a continuous treatment process of forming a silicone porous body of the present invention. As shown in the cross sectional view of FIG. 6, this method is the same as the method shown in FIGS. 1 to 3 except that (4) strength increasing step (aging step) is carried out after the (3) chemical treatment step (for example, crosslinking treatment step) of forming a silicone porous body 20. As shown in FIG. 6, the strength of the silicone porous body 20 is increased in the (4) strength increasing step (aging step), thereby forming a silicone porous body 21 with a greater strength. There is no particular limitation on the (4) strength increasing step (aging step), and can be, for example, as described above.

FIG. 7 is a schematic view showing an example of a slot die coating apparatus and an example of the method of forming a silicone porous body using the same, which are different from those shown in FIG. 2. As can be seen, the coating apparatus shown in FIG. 7 is the same as the apparatus shown in FIG. 2 except that the apparatus shown in FIG. 7 includes a strength increasing zone (aging zone) 130 where the (4) strength increasing step (aging step) is carried out right next to the chemical treatment zone 120 where the (3) chemical treatment step is carried out. That is, after the (3) chemical treatment step, the (4) strength increasing step (aging step) is carried out in the strength increasing zone (aging zone) 130 to increase the peel strength of the silicone porous body 20 relative to a resin film 10, thereby forming a silicone porous body 21 having a higher peel strength. The (4) strength increasing step (aging step) may be carried out by heating the silicone porous body 20 in the same manner as described above using hot air fans (heating units) 131 disposed above and below the base 10, for example. The conditions including the heating temperature, the time, and the like are not limited to particular values, and can be, for example, as described above. After the (4) strength increasing step, similar to the process shown in FIG. 3, a laminated film in which the silicone porous body 21 is formed on the base 10 is wound by a winding roller 105.

FIG. 8 is a schematic view showing an example of a micro-gravure coating apparatus and an example of the method of forming a porous structure using the same, which are different from those shown in FIG. 3. As can be seen, the coating apparatus shown in FIG. 8 is the same as the apparatus shown in FIG. 3 except that the apparatus shown in FIG. 8 includes a strength increasing zone (aging zone) 230 where the (4) strength increasing step (aging step) is carried out right next to the chemical treatment zone 220 where the (3) chemical treatment step is carried out. That is, after the (3) chemical treatment step, the (4) strength increasing step (aging step) is carried out in the strength increasing zone (aging zone) 230 to increase the peel strength of the silicone porous body 20 relative to a resin film 10, thereby forming a silicone porous body 21 having a higher peel strength. The (4) strength increasing step (aging step) may be carried out by heating the silicone porous body 20 in the same manner as described above using hot air fans (heating units) 231 disposed above and below the base 10, for example. The conditions including the heating temperature, the time, and the like are not limited to particular values, and can be, for example, as described above. After the (4) strength increasing step, similar to the process shown in FIG. 3, a laminated film in which the silicone porous body 21 is formed on the base 10 is wound by a winding roller 251.

Figure 9:
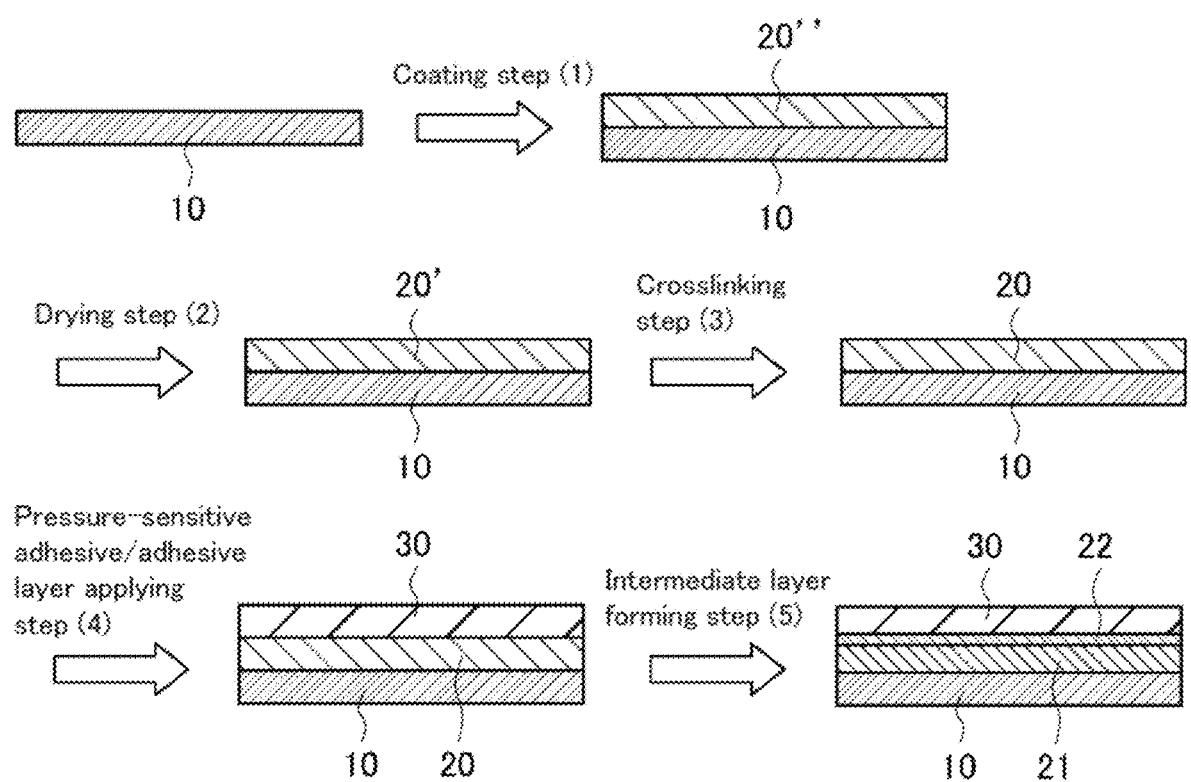
FIG. 9 is a process cross sectional view showing still another example of the method of forming a silicone porous body on a base in the present invention.
Figure 10:
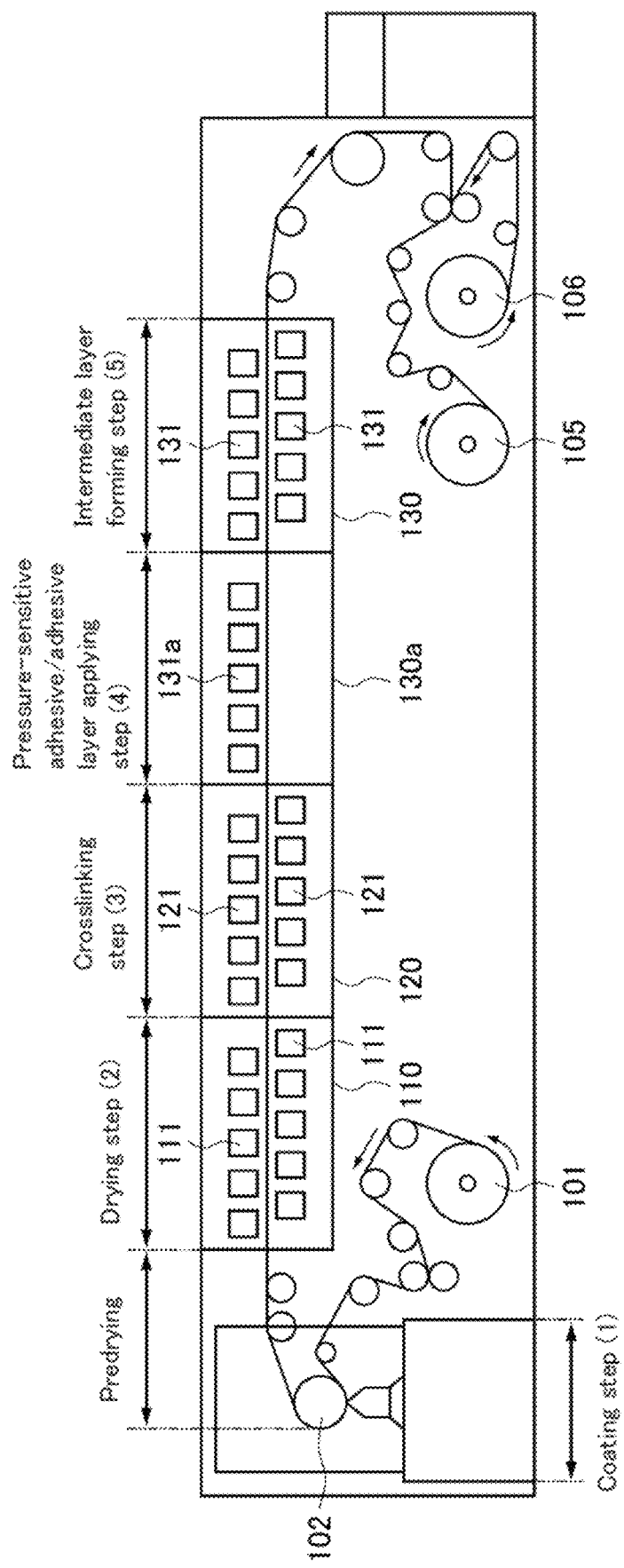
FIG. 10 is an illustration schematically showing still another example of a part of the process of producing a silicone porous body of the present invention and still another example of the apparatus used therefore.
Figure 11:
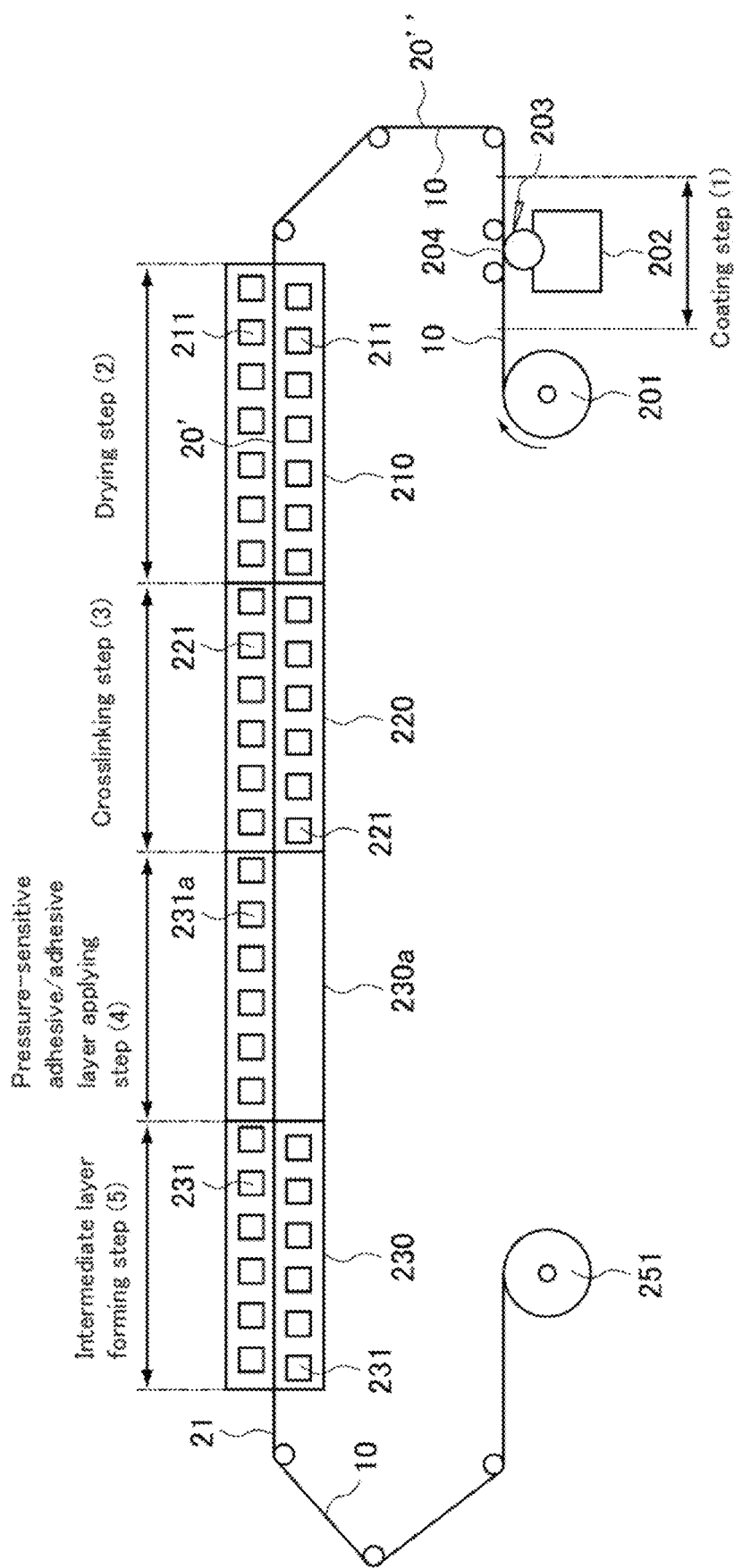
FIG. 11 is an illustration schematically showing still another example of a part of the process of producing a silicone porous body of the present invention and still another example of the apparatus used therefore.

FIGS. 9 to 11 show another example of a continuous treatment process of forming a silicone porous body of the present invention. As shown in the cross sectional view of FIG. 9, this method includes, after the (3) chemical treatment step (for example, crosslinking treatment step) of forming a silicone porous body 20, (4) pressure-sensitive adhesive/adhesive layer applying step (pressure-sensitive adhesive/adhesive layer forming step) of coating the silicone porous body 20 with pressure-sensitive adhesive/adhesive layer 30 and (5) intermediate layer forming step of causing the silicone porous body 20 to react with the pressure-sensitive adhesive/adhesive layer 30 to form an intermediate layer 22. Except for these, the method shown in FIGS. 9 to 11 is the same as the method shown in FIGS. 6 to 8. In, FIG. 9, the (5) intermediate layer forming step also serves as a step of increasing the strength of the silicone porous body 20 (strength increasing step) so that the silicone porous body 20 changes to a silicone porous body 21 having a higher strength after the (5) intermediate layer forming step. The present invention, however, is not limited thereto, and the silicone porous body 20 may not change after the (5) intermediate layer forming step, for example. The (4) pressure-sensitive adhesive/adhesive layer applying step (pressure-sensitive adhesive/adhesive layer forming step) and the (5) intermediate layer forming step are not particularly limited, and can be, for example, as described above.

FIG. 10 is a schematic view showing another example of a slot die coating apparatus and another example of the method of forming a silicone porous body using the same. As can be seen, the coating apparatus shown in FIG. 10 is the same as the apparatus shown in FIG. 7 except that the apparatus shown in FIG. 10 includes a pressure-sensitive adhesive/adhesive layer applying zone 130a where the (4) pressure-sensitive adhesive/adhesive layer applying step is carried out right next to the chemical treatment zone 120 where the (3) chemical treatment step is carried out. In FIG. 10, the same heat treatment as that carried out in the strength increasing zone (aging zone) 130 of FIG. 7 can be carried out in an intermediate layer forming zone (aging zone) 130 disposed right next to the pressure-sensitive adhesive/adhesive layer applying zone 130a using hot air fans (heating units) 131 disposed above and below the base 10. That is, the apparatus shown in FIG. 10 carries out, after the (3) chemical treatment step, the (4) pressure-sensitive adhesive/adhesive layer applying step (pressure-sensitive adhesive/adhesive layer forming step) of applying a pressure-sensitive adhesive or an adhesive to the silicone porous body 20 to form a pressure-sensitive adhesive/adhesive layer 30 in the pressure-sensitive adhesive/adhesive layer applying zone 130a using pressure-sensitive adhesive/adhesive layer applying units 131a. Instead of applying the pressure-sensitive adhesive or the adhesive, for example, an adhesive tape including the pressure-sensitive adhesive/adhesive layer 30 may be adhered (taped) as described above. Thereafter, the (5) intermediate layer forming step (aging step) is carried out in the intermediate layer forming zone (aging zone) 130 to cause the silicone porous body 20 to react with the pressure-sensitive adhesive/adhesive layer 30, thereby forming an intermediate layer 22. In this step, the silicone porous body 20 changes to a silicone porous body 21 having a higher strength as described above. The conditions of the hot air fans (heating units) 131 including the heating temperature, the time, and the like are not limited to particular values, and can be, for example, as described above.

FIG. 11 is a schematic view showing another example of a micro-gravure coating apparatus and another example of the method of forming a porous structure using the same. As can be seen, the coating apparatus shown in FIG. 11 is the same as the apparatus shown in FIG. 8 except that the apparatus shown in FIG. 11 includes a pressure-sensitive adhesive/adhesive layer applying zone 230a where the (4) pressure-sensitive adhesive/adhesive layer applying step is carried out right next to the chemical treatment zone 220 where the (3) chemical treatment step is carried out. In FIG. 11, the same heat treatment as that carried out in the strength increasing zone (aging zone) 230 of FIG. 8 can be carried out in an intermediate layer forming zone (aging zone) 230 disposed right next to the pressure-sensitive adhesive/adhesive layer applying zone 230a using hot air fans (heating units) 231 disposed above and below the base 10. That is, the apparatus shown in FIG. 11 carries out, after the (3) chemical treatment step, the (4) pressure-sensitive adhesive/adhesive layer applying step (pressure-sensitive adhesive/adhesive layer forming step) of applying a pressure-sensitive adhesive or an adhesive to the silicone porous body 20 to form a pressure-sensitive adhesive/adhesive layer 30 in the pressure-sensitive adhesive/adhesive layer applying zone 230a using pressure-sensitive adhesive/adhesive layer applying units 231a. Instead of applying the pressure-sensitive adhesive or the adhesive, for example, an adhesive tape including the pressure-sensitive adhesive/adhesive layer 30 may be adhered (taped) as described above. Thereafter, the (5) intermediate layer forming step (aging step) is carried out in the intermediate layer forming zone (aging zone) 230 to cause the silicone porous body 20 to react with the pressure-sensitive adhesive/adhesive layer 30, thereby forming an intermediate layer 22. In this step, the silicone porous body 20 changes to a silicone porous body 21 having a higher strength as described above. The conditions of the hot air fans (heating units) 231 including the heating temperature, the time, and the like are not limited to particular values, and can be, for example, as described above.

[3. Application of Silicone Porous Body]

Since the silicone porous body of the present invention has a function equivalent to an air layer as described above, it can be used for an object including the air layer in place of the air layer, for example. The present invention is characterized in that it includes the silicone porous body of the present invention, and other configurations are by no means limited.

Examples of the application of the present invention include heat insulating materials, sound absorbing materials, dew condensation preventing materials, and optical elements such as low refractive index layers, each of which includes the silicone porous body. These members of the present invention can be used by disposing them at a place where an air layer is needed, for example, if they are transparent. The form of these members is not limited to particular forms, and can be, for example, a film.

The present invention can be also applied to, for example, a regenerative medical base including the silicone porous body. The base can be, for example, scaffolding. The silicone porous body of the present invention has a porous structure which has a function equivalent to an air layer as described above. Since the void spaces of the silicone porous body of the present invention are optimal to hold cells, nutrient sources, air, and the like, for example, the silicone porous body of the present invention is useful as a regenerative medical scaffolding, for example.

Examples of the member including the silicone porous body of the present invention include, besides these, total reflection members, ink image receiving materials, antireflection monolayers, moth eye monolayers, and permittivity materials.

EXAMPLES

The examples of the present invention are described below. The present invention, however, is not limited by the following examples.

Example 1

In the present example, a porous structure of the present invention was produced as described below.

(1) Gelation of Silicon Compound 0.95 g of MTMS which is the precursor of a silicon compound was dissolved in 2.2 g of DMSO. 0.5 g of 0.01 mol/L oxalic acid aqueous solution was added to the mixture, and the resultant was stirred at room temperature for 30 minutes to hydrolyze MTMS, thereby preparing tris(hydroxy)methylsilane.

0.38 g of ammonia water having a concentration of 28% and 0.2 g of pure water were added to 5.5 g of DMSO, then the aforementioned mixture that had been subjected to the hydrolysis treatment was added thereto, and the resultant was stirred at room temperature for 15 minutes to gelate tris(hydroxy)methylsilane, thereby obtaining a gelled silicon compound.

(2) Aging Treatment

The aging treatment was carried out as follows. The mixture that had been subjected to the gelation treatment was incubated at 40° C. for 20 hours.

(3) Pulverizing Treatment

Subsequently, the gelled silicon compound that had been subjected to the aging treatment was granulated into pieces of several millimeters to several centimeters using a spatula. 40 g of IPA was added thereto, the mixture was stirred lightly and then was allowed to stand still at room temperature for 6 hours, and a solvent and a catalyst in the gel were decanted. This decantation treatment was repeated three times, and the solvent replacement was completed. Then, the gelled silicon compound in the mixture was subjected to high pressure medialess pulverization. This pulverizing treatment was carried out using a homogenizer (product of SMT Corporation, product name: UH-50) as follows. That is, 1.18 g of gel and 1.14 g of IPA were added to 5 cc screw bottle and pulverized for 2 minutes at 50 W and 20 kHz.

The gelled silicon compound in the mixture was pulverized by the pulverizing treatment, whereby the mixture was changed to a sol particle liquid of the pulverized product. The volume average particle size showing particle size variations of the pulverized products contained in the mixture measured by a dynamic light scattering nanotrac particle size analyzer (product of NIKKISO CO., LTD., product name: UPA-EX150) was 0.50 to 0.70. 0.02 g of 0.3 wt % KOH aqueous solution, which is a catalyst, was added to 0.5 g of the sol particle liquid, thereby preparing a coating liquid.

(4) Formation of Coating Film and Formation of Silicone Porous Body

The coating liquid was applied to the surface of a base made of polyethylene terephthalate (PET) by bar coating, thereby forming a coating film. 6 µL of the sol particle liquid was applied to per square millimeter of the surface of the base. The coating film was treated at 100° C. for one minute, and the crosslinking reaction among the pulverized products was completed. Thereby, a silicone porous body having a thickness of 1 µm in which the pulverized products are chemically bonded was formed on the base.

Comparative Example 1

A porous body was formed in the same manner as in Example 1 except that KOH, which is a catalyst, was not added to the coating liquid.

(5) Measurement of Porous Structure Property

The porous body was peeled from the base, and the strength (abrasion resistance measured with BEMCOT®) was measured according to the aforementioned method. The refractive index, haze, and proportion of void space were also measured.

The results are summarized in the following Table 1.

TABLE 1

| Item | Example 1 | Comparative Example 1 |
|---|---|---|
| Refractive index | 1.16 | 1.12 |
| Haze | 0.3 | 0.3 |
| Porosity | 59% | 75% |
| Abrasion resistance | 78% | 6% |

As summarized in Table 1, the silicone porous body having a thickness of 1 µm obtained in Example 1, despite its porous structure with high proportion of void space, has a sufficient strength and sufficient flexibility. This shows that the silicone porous body of the present invention obtained by a crosslinking reaction of aged silica compound gel is very useful as a silanol porous body which achieves both the film strength and flexibility. Furthermore, the silicone porous body obtained in Example 1 has favorable optical characteristics such as a low refractive index and a low haze. FIG. 4 shows the cross sectional SEM image of the silicone porous body of Example 1. FIG. 5 shows the TEM image of the microporous particles in the silicone porous body of Example 1.

Example 2

In the present example, a porous structure of the present invention was produced as described below.

The "(1) gelation of silicon compound" and the "(2) aging treatment" were carried out in the same manner as in Example 1. Subsequently, the "(3) pulverizing treatment" was carried out in the same manner as in Example 1 except that an isopropyl alcohol (IPA) solution containing 1.5 wt % photobase generation catalyst (product of Wako Pure Chemical Industries, Ltd., product name: WPBG 266) instead of 0.3 wt % KOH aqueous solution was added to the sol particle liquid, thereby preparing a coating liquid. The amount of the IPA solution containing the photobase generation catalyst to be added relative to 0.75 g of the sol particle liquid was 0.031 g. Then, the "(4) formation of coating film and formation of silicone porous body" were carried out in the same manner as in Example 1. The porous body obtained in this manner after drying was irradiated with UV. The condition for the UV irradiation was as follows. That is, the wavelength of the light was 360 nm and the amount of the light irradiation (energy) was 500 mJ. After UV irradiation, thermal aging at 60° C. was carried out for 22 hours, thereby forming a porous structure of the present example.

Example 3

A porous structure of the present example was produced in the same manner as in Example 2 except that thermal aging was not performed after UV irradiation.

Example 4

A porous structure of the present example was produced in the same manner as in Example 2 except that, after the IPA solution containing the photobase generation catalyst had been added, 0.018 g of 5 wt % bis(trimethoxy)silane was added to 0.75 g of sol liquid to adjust a coating liquid.

Example 5

A porous structure of the present example was produced in the same manner as in Example 2 except that the amount of the IPA solution containing the photobase generation catalyst to be added relative to 0.75 g of the sol liquid was 0.054 g.

Example 6

After subjecting the porous body after drying to the UV irradiation in the same manner as in Example 2 and before subjecting the porous body to the thermal aging, the pressure-sensitive adhesive side of a PET film, to one side of which a pressure-sensitive adhesive (pressure-sensitive adhesive/adhesive layer) is applied, was adhered to the porous body at room temperature, and then the porous body was subjected to thermal aging at 60° C. for 22 hours. Except for this, a porous structure of the present example was produced in the same manner as in Example 2.

Example 7

A porous structure of the present example was produced in the same manner as in Example 6 except that thermal aging was not carried out after adhering the PET film.

Example 8

A porous structure of the present example was produced in the same manner as in Example 6 except that, after the IPA solution containing the photobase generation catalyst had been added, 0.018 g of 5 wt % bis(trimethoxy)silane was added to 0.75 g of the sol liquid to adjust a coating liquid.

Example 9

A porous structure of the present example was produced in the same manner as in Example 6 except that the amount of the IPA solution containing the photobase generation catalyst to be added relative to 0.75 g of the sol liquid was 0.054 g.

The refractive index and haze of the porous structures of Examples 2 to 9 were measured according to the aforementioned method. The results are summarized in Tables 2 and 3.

TABLE 2

|  | Ex. 2 | Ex. 3 | Ex. 4 | Ex. 5 |
| --- | --- | --- | --- | --- |
| Refractive index | 1.14 | 1.15 | 1.15 | 1.16 |
| Haze | 0.4 | 0.4 | 0.4 | 0.4 |
| Porosity | 65% | 62% | 62% | 59% |
| Abrasion resistance | 70% | 70% | 75% | 78% |

TABLE 3

|  | Ex. 6 | Ex. 7 | Ex. 8 | Ex. 9 |
| --- | --- | --- | --- | --- |
| Refractive index | 1.14 | 1.15 | 1.15 | 1.16 |
| Haze | 0.4 | 0.4 | 0.4 | 0.4 |
| Porosity | 65% | 62% | 62% | 59% |
| Abrasion resistance | 70% | 75% | 75% | 78% |

As summarized in Tables 2 and 3, each of the silicone porous bodies having a thickness of 1 μm obtained in Examples 2 to 9 has favorable optical characteristics such as a very low refractive index in the range from 1.14 to 1.16 and a very low haze value of 0.4. Note that when the silicone porous body has a very low refractive index, the silicone porous body has a high proportion of void space. In fact, as summarized in Tables 2 and 3, each of the silicone porous bodies has a high proportion of void space. Furthermore, each of the silicone porous bodies of Examples 2 to 9 has a sufficient strength and sufficient flexibility as in Example 1. Each of the coating liquids of Examples 2 to 9 was visually observed after one week storage, and no change was observed. This shows that the coating liquid is superior in the storage stability and that a silicone porous body of stable quality can be produced efficiently.

INDUSTRIAL APPLICABILITY

As described above, the silicone porous body of the present invention containing the pulverized products of the gelled silicon compound forms a porous structure with void spaces, and the pulverized products are chemically bonded by the porous structure so that the porous structure is immobilized. Thus, the silicone porous body of the present invention, despite its structure with void spaces, can maintain a sufficient strength and flexibility. The silicone porous body of the present invention is useful in that it can provide a void-provided structure which requires a film strength and flexibility. For example, the silicone porous body of the present invention can be used, as a member utilizing voids, for products in a wide range of fields, including optical elements such as low refractive index layers, heat insulating materials, sound absorbing materials, and ink image receiving members.

EXPLANATION OF REFERENCE NUMERALS

10 base
20 porous structure
20' coating film (precursor layer)
20" sol particle liquid
21 porous structure (porous body) with improved strength
101 delivery roller
102 coating roller
110 oven zone
111 hot air fan (heating unit)
120 chemical treatment zone
121 lamp (light irradiation unit) or hot air fan (heating unit)
130a pressure-sensitive adhesive/adhesive layer applying zone
130 intermediate forming zone
131a pressure-sensitive adhesive/adhesive layer applying unit
131 hot air fan (heating unit)
105 winding roller
106 roller
201 delivery roller
202 liquid reservoir
203 doctor (doctor knife)'
204 micro-gravure
210 oven zone
211 heating unit
220 chemical treatment zone
221 lamp (light irradiation unit) or hot air fan (heating unit)
230a pressure-sensitive adhesive/adhesive layer applying zone
230 intermediate forming zone
231a pressure-sensitive adhesive/adhesive layer applying unit
231 hot air fan (heating unit)
251 winding roller

The invention claimed is:
1. A method of producing a silicone porous body, comprising steps of:
preparing a liquid containing silicon compound microporous particles;
adding a catalyst for chemically bonding the silicon compound microporous particles to the liquid; and
chemically bonding the microporous particles by catalysis.

2. The method according to claim 1, wherein the catalysis in the bonding step is wet-type treatment and/or dry-type treatment.

3. The method according to claim 1, wherein the silicon compound microporous particle includes a silica sol fine particle.

4. The method according to claim 3, wherein the silica sol fine particle is obtained by pulverizing a gelled silica compound.

5. The method according to claim 4, wherein the pulverization is performed by high pressure medialess pulverizing.

6. The method according to any one of claim 1, wherein in the bonding step, the chemical bond is a crosslinking bond.

7. The method according to any one of claim 1, wherein a drying temperature for the catalysis in the bonding step is 50° C. or more and less than 200° C.

8. The method according to any one of claim 1, further comprising a step of:
adding a crosslinking assisting agent for indirectly bonding the silicon compound microporous particles to the liquid.

9. The method according to claim 8, wherein an amount of the crosslinking assisting agent to be added relative to a weight of the silicon compound microporous particle is in a range from 0.01 wt % to 20 wt %.

* * * * *